(12) United States Patent
Koo et al.

(10) Patent No.: US 11,449,319 B2
(45) Date of Patent: Sep. 20, 2022

(54) METHOD AND APPARATUS FOR DOWNLOADING BUNDLE TO SMART SECURE PLATFORM BY USING ACTIVATION CODE

(71) Applicant: Samsung Electronics Co., Ltd., Suwon-si (KR)

(72) Inventors: Jonghoe Koo, Suwon-si (KR); Kangjin Yoon, Suwon-si (KR); Duckey Lee, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 16/792,052

(22) Filed: Feb. 14, 2020

(65) Prior Publication Data

US 2020/0264857 A1 Aug. 20, 2020

(30) Foreign Application Priority Data

Feb. 14, 2019 (KR) .................. 10-2019-0017402
Jul. 10, 2019 (KR) .................. 10-2019-0083438

(51) Int. Cl.
*G06F 8/60* (2018.01)
*H04W 12/43* (2021.01)
*G06F 8/61* (2018.01)
*G06K 7/14* (2006.01)

(52) U.S. Cl.
CPC .............. *G06F 8/60* (2013.01); *H04W 12/43* (2021.01); *G06F 8/61* (2013.01); *G06K 7/1417* (2013.01)

(58) Field of Classification Search
CPC . G06F 8/60; G06F 8/61; H04W 12/43; G06K 7/1417
See application file for complete search history.

(56) References Cited

U.S. PATENT DOCUMENTS 7,840,645 B1 * 11/2010 Chase ................... H04L 67/563
709/219
9,705,546 B2    7/2017 Lee et al.
9,736,688 B2 *  8/2017 Li ........................... G08B 5/222
(Continued)

FOREIGN PATENT DOCUMENTS

EP        3203767 A1    8/2017
KR   10-2016-0010239 A 1/2016
KR   10-2017-0124360 A 11/2017

OTHER PUBLICATIONS

Dragomir et al., "A Survey on Secure Communication Protocols for IoT Systems", 2016, IEEE (Year: 2016).*
(Continued)

*Primary Examiner* — Wei Y Zhen
*Assistant Examiner* — Junchun Wu

(57) ABSTRACT

An operating method of a terminal, in which a smart secure platform (SSP) is embedded, in a wireless communication system, includes obtaining an activation code, detecting an SSP activation code delimiter in the activation code, detecting an SSP activation code in the activation code by using the SSP activation code delimiter, and downloading at least one of a bundle or an applet by using the SSP activation code, wherein the SSP activation code delimiter is used to separate the SSP activation code from an embedded subscriber identity module (eSIM) activation code.

16 Claims, 13 Drawing Sheets

(56) References Cited

U.S. PATENT DOCUMENTS

| | | | |
|---|---|---|---|
| 10,469,462 | B2 | 11/2019 | Kim et al. |
| 10,625,735 | B2* | 4/2020 | Matsunaga ............ G01S 13/867 |
| 2003/0163800 | A1* | 8/2003 | Zhou ........................ G06K 1/00 |
| | | | 717/106 |
| 2012/0117635 | A1* | 5/2012 | Schell ..................... G06F 21/34 |
| | | | 726/5 |
| 2013/0185400 | A1* | 7/2013 | Larson ................ H04L 41/0886 |
| | | | 709/220 |
| 2015/0089586 | A1 | 3/2015 | Ballesteros |
| 2016/0180103 | A1* | 6/2016 | Fisher ................... G06F 21/629 |
| | | | 726/27 |
| 2016/0212129 | A1 | 7/2016 | Johnston et al. |
| 2017/0006473 | A1 | 1/2017 | Hauck et al. |
| 2019/0080127 | A1* | 3/2019 | Yoshida .............. G06F 3/04162 |
| 2020/0137572 | A1* | 4/2020 | Lee ........................ H04W 12/04 |
| 2020/0264857 | A1* | 8/2020 | Koo ....................... G06Q 20/326 |
| 2021/0058774 | A1* | 2/2021 | Yang ................... H04W 12/086 |
| 2021/0235245 | A1* | 7/2021 | Fan ........................ G06F 9/4843 |
| 2022/0053029 | A1* | 2/2022 | Koo ......................... H04L 67/04 |
| 2022/0095098 | A1* | 3/2022 | Yoon ..................... H04W 12/06 |

OTHER PUBLICATIONS

Mukherjee et al., "Improving Bandwidth of Communication Controllers", 1988, IEEE (Year: 1988).*

Kritikou et al., "A Modified Cooperative A* Algorithm for the Simultaneous Motion of Multiple Microparts on a "Smart Platform" with Electrostatic Fields", Oct. 2018, http://www.mdpi.com/journal/micromachines (Year: 2018).*

Chitroub et al., "SIM Card of the next-generation wireless network: Security, Potential Vulnerabilities and Solutions", 2018, IEEE (Year: 2018).*

International Search Report and Written Opinion of the International Searching Authority in connection with International Application No. PCT/KR2020/002162 dated May 27, 2020, 8 pages.

European Patent Office, "Supplementary European Search Report" dated Jan. 17, 2022, in connection with European Patent Application No. 20755370.2, 13 pages.

Giesecke+Devrient Mobile Security, "Add requirements to cover the need for dealing with GSMA Remote SIM Provisioning" ETSI TC SCP REQ Meeting #75, Tdoc SCPREQ(19)000013, London, UK, Feb. 13-15, 2019, 4 pages.

Samsung, "Discussion on iSSP Unique Identifier" ETSI TC SCP REQ Meeting #71, SCPREQ(18)000124, Paris, FR, Sep. 17-20, 2018, 12 pages.

G+D Mobile Security et al., "iSSP and RSP ecosystem alignment—Input for ETSI SCP REQ #75" SCPREQ(19)000011, Feb. 6, 2019, 27 pages.

* cited by examiner

FIG. 4

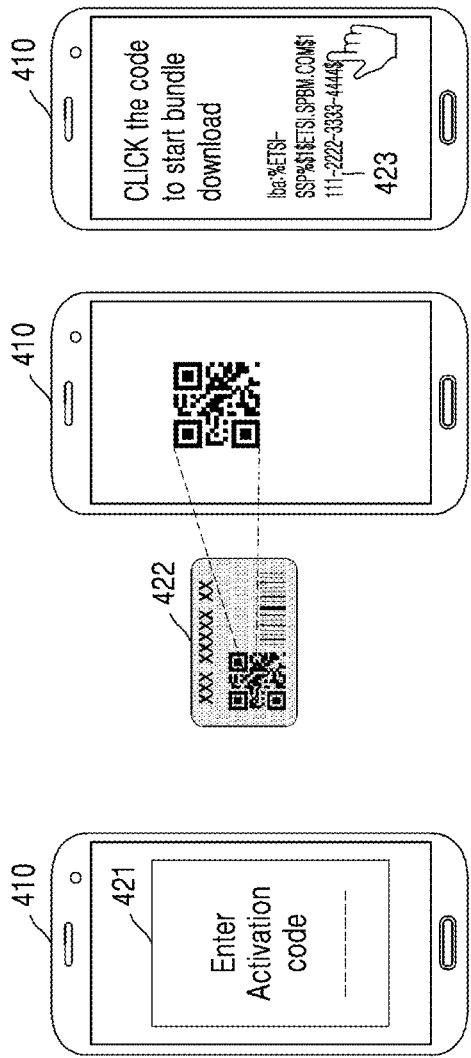

| Format | Content of SSP Activation Code | |
|---|---|---|
| String for manual typing | %ETSI-SSP%$1$ETSI.SPBM.COM$1111-2222-3333-4444 | 431 |
| For QR code to be scanned | LBA:%ETSI-SSP%$1$ETSI.SPBM.COM$1111-2222-3333-4444 | 432 |
| For QR code to be scanned | LPA:1$SMDP.EXAMPLE.COM$04386-AGYFT-A74Y8-3F815$%ETSI-SSP%$1$ETSI.SPBM.COM$1111-2222-3333-4444 | 433 |
| Link to be clicked | lba:%ETSI-SSP%$1$ETSI.SPBM.COM$1111-2222-3333-4444 | 434 |
| Link to be clicked | lpa:1$SMDP.EXAMPLE.COM$04386-AGYFT-A74Y8-3F815$%ETSI-SSP%$1$ETSI.SPBM.COM$1111-2222-3333-4444 | 435 |

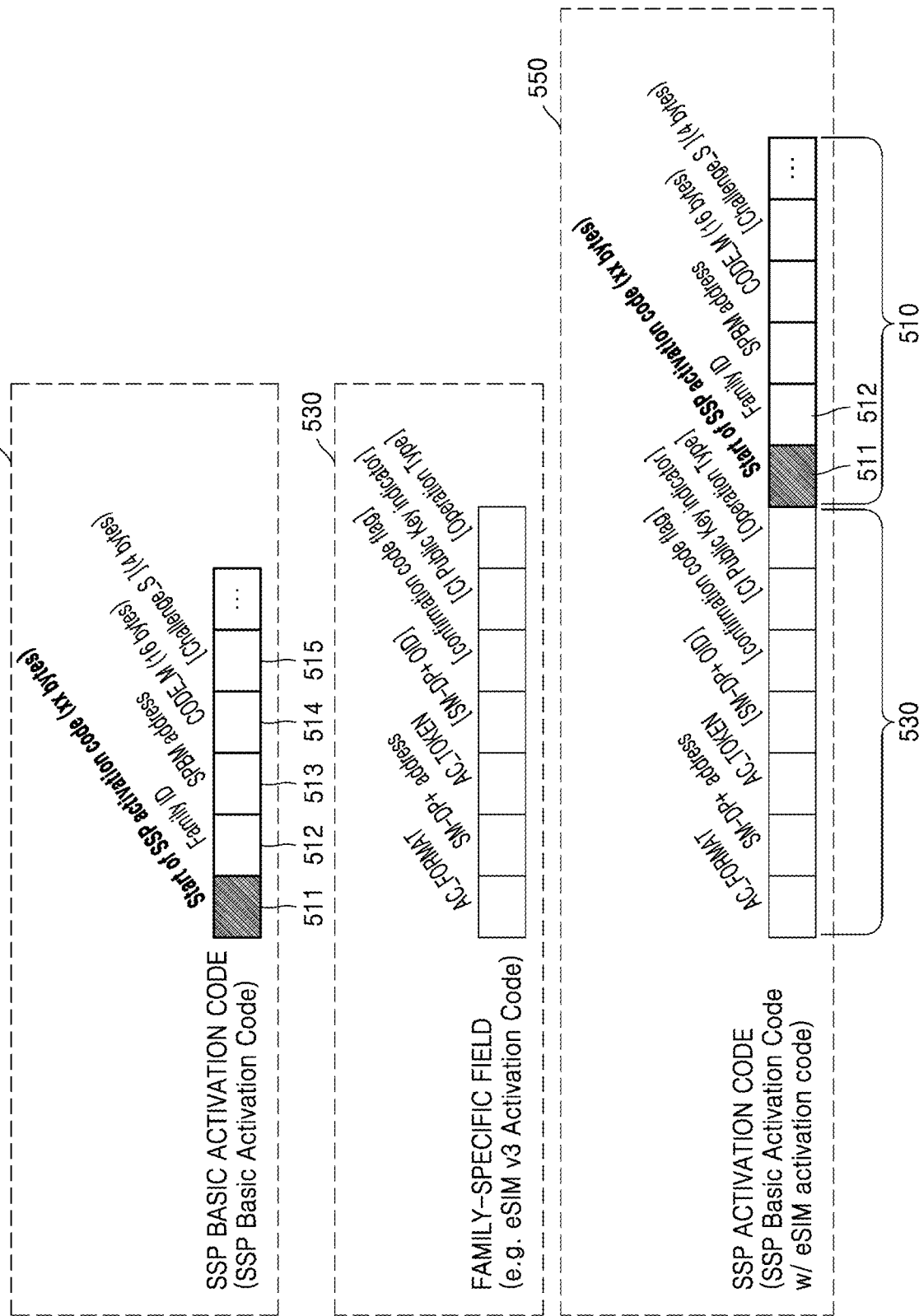

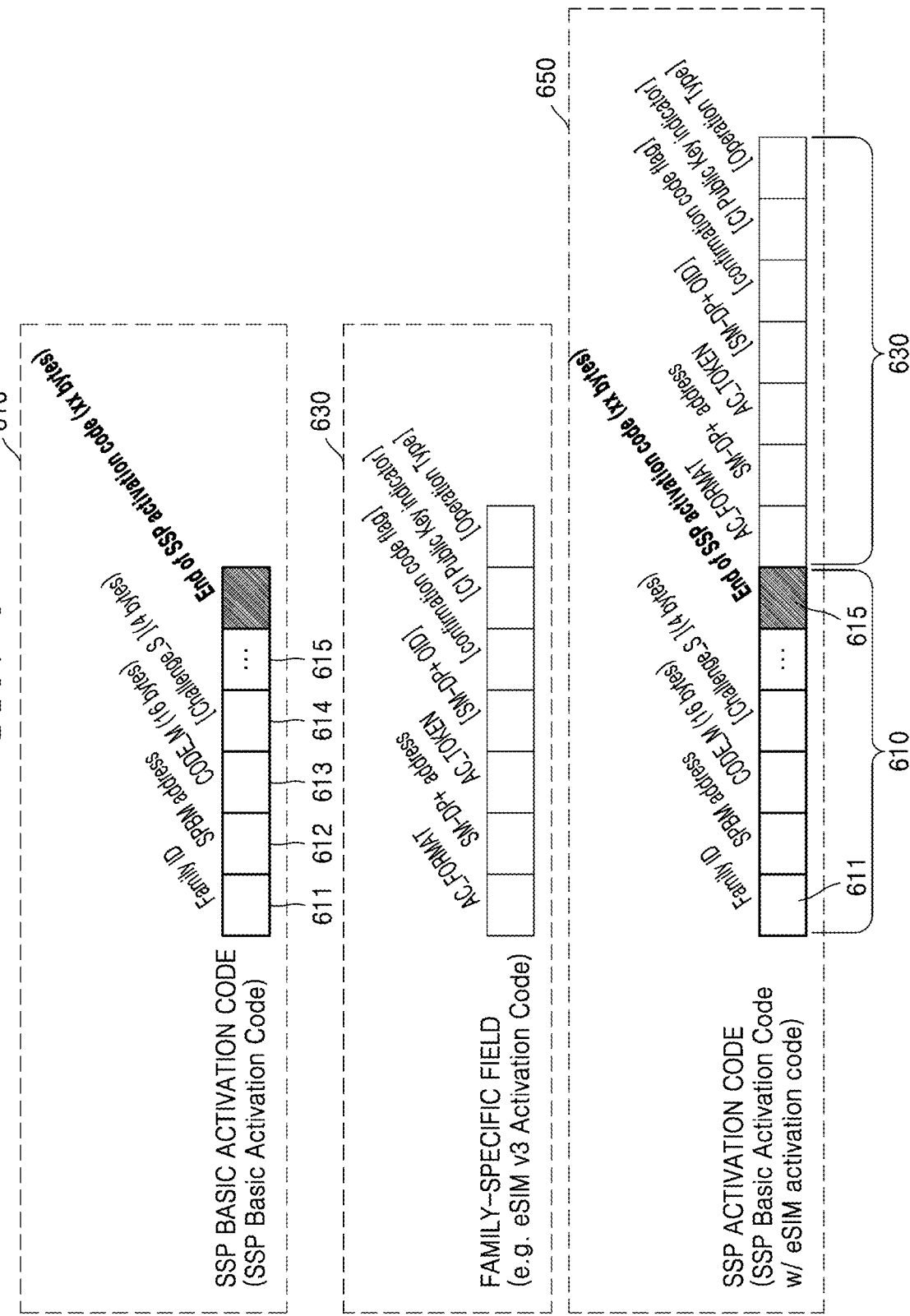

METHOD AND APPARATUS FOR DOWNLOADING BUNDLE TO SMART SECURE PLATFORM BY USING ACTIVATION CODE

CROSS-REFERENCE TO RELATED APPLICATIONS

This application is based on and claims priority under 35 U.S.C. § 119 to Korean Patent Application No. 10-2019-0017402 filed on Feb. 14, 2019, and Korean Patent Application No. 10-2019-0083438 filed on Jul. 10, 2019 in the Korean Intellectual Property Office, the disclosures of which are incorporated by reference herein in their entirety.

BACKGROUND

1. Field

The disclosure relates to a method and an apparatus for downloading, installing, and storing a bundle on a smart secure platform of a terminal.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (for example, a 60-GHz band) is being considered. To reduce path loss of radio waves and increase transmission distance of radio waves in an ultra-high frequency band, in 5G communication systems, technologies such as beamforming, massive multiple-input and multiple-output (massive MIMO), full-dimensional MIMO (FD-MIMO), array antennas, analog beamforming, and large-scale antennas have been discussed. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are used and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology. As various services may be provided according to the advances in mobile communication systems as described above, methods for effectively providing these services are used.

SUMMARY

Provided is a method for installing a bundle to a smart secure platform of an electronic device after a user makes a payment for and obtains authorization for a service to be received by using a bundle to be installed to the electronic device, the method allowing an activation code recognizable by terminal software to be configured.

Additional aspects will be set forth in part in the description which follows and, in part, will be apparent from the description, or may be learned by practice of the presented embodiments of the disclosure.

According to an embodiment of the disclosure, an operating method of a terminal, in which a smart secure platform (SSP) is embedded, in a wireless communication system includes obtaining an activation code, detecting an SSP activation code delimiter in the activation code, detecting an SSP activation code in the activation code by using the SSP activation code delimiter, and downloading at least one of a bundle or an applet by using the SSP activation code, wherein the SSP activation code delimiter is used to separate the SSP activation code from an embedded subscriber identity module (eSIM) activation code.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a diagram illustrating a method of inputting an SSP activation code to an SSP terminal, according to some embodiments of the disclosure;

FIG. 5 is a diagram illustrating an example of a configuration of an SSP activation code including a family-specific field, according to some embodiments of the disclosure;

FIG. 6 is a diagram illustrating another example of a configuration of an SSP activation code including a family-specific field, according to some embodiments of the disclosure;

DETAILED DESCRIPTION

Figure 1:
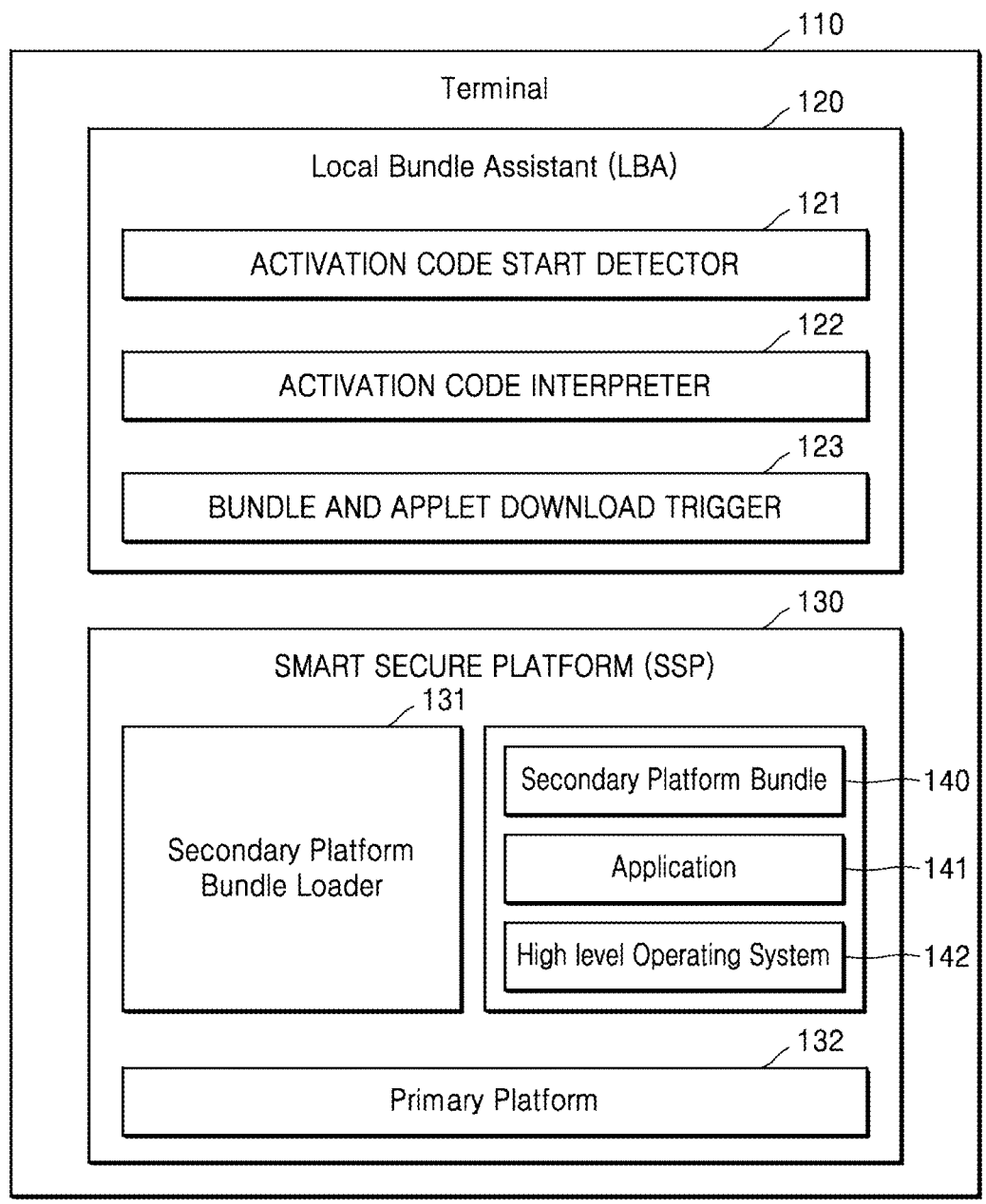
FIG. 1 is a diagram illustrating a terminal in which a smart secure platform (SSP) is embedded and a local bundle assistant (LBA) application is installed, according to some embodiments of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, embodiments of the disclosure will be described in detail with reference to the accompanying drawings.

In describing embodiments of the disclosure, technical descriptions well known in the art and not related directly to the disclosure will be omitted. This is for more clearly delivering the subject matter of the disclosure without ambiguity by omitting unnecessary descriptions.

For similar reasons, in the accompanying drawings, some components are exaggerated, omitted, or briefly illustrated. In addition, the size of each component does not completely reflect the actual size thereof. In each drawing, the same reference numerals are given to the same or corresponding components.

The advantages and features of the disclosure, and methods of achieving the same will become apparent from the detailed description of the following embodiments of the disclosure in conjunction with the accompanying drawings. However, it should be understood that the disclosure is not limited to the following embodiments and may be embodied in different ways, that the embodiments of the disclosure are provided only for complete disclosure and thorough understanding of the disclosure for those of ordinary skill in the art, and that the scope of the disclosure is defined only by the accompanying claims and equivalents thereof. Like components will be denoted by like reference numerals throughout the specification.

Here, it will be understood that each block of the flowchart illustrations and combinations of blocks in the flowchart illustrations may be implemented by computer program instructions. Because these computer program instructions may be loaded into processors of general-purpose computers, special-purpose computers, or other programmable data processing apparatuses, the instructions executed via processors of the computers or other programmable data processing apparatuses create means for implementing the functions specified in the flowchart block(s). Because these computer program instructions may also be stored in computer usable or computer readable memory capable of directing computers or other programmable data processing apparatuses to function in a particular manner, the instructions stored in the computer usable or computer readable memory may produce an article of manufacture including instruction means for implementing the functions specified in the flowchart block(s). Because the computer program instructions may be loaded onto a computer or other programmable data processing apparatuses, a series of operational steps may be performed on the computer or other programmable data processing apparatuses to produce a computer implemented process, and thus, the instructions executed on the computer or other programmable data processing apparatuses may provide processes for implementing the functions specified in the flowchart block(s).

In addition, each block may represent a module, segment, or portion of code, which includes one or more executable instructions for implementing the specified logical function(s). Further, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

As used herein, the term " . . . unit (or . . . er/or)" refers to a software component or a hardware component such as a field programmable gate array (FPGA) or an application-specific integrated circuit (ASIC), and a " . . . unit (or . . . er/or)" performs certain functions. However, the meaning of a " . . . unit (or . . . er/or)" is not limited to software or hardware. A " . . . unit (or . . . er/or)" may be in an addressable storage medium or may be configured to regenerate one or more processors. Therefore, as an example, a " . . . unit (or . . . er/or)" includes components, such as software components, object-oriented software components, class components, and task components, processes, functions, attributes, procedures, subroutines, segments of program code, drivers, firmware, microcode, circuitry, data, databases, data structures, tables, arrays, and variables. A function provided in components and " . . . units (or . . . ers/ors)" may be combined into fewer components and " . . . units (or . . . ers/ors)" or may be further divided into additional components and " . . . units (or . . . ers/ors)". In addition, components and " . . . units (or . . . ers/ors)" may be implemented to regenerate one or more central processing units (CPUs) in a device or a secure multimedia card.

Particular terms used in the following descriptions are provided to aid in the understanding of the disclosure, and these particular terms may be changed into other forms and used without departing from the spirit and scope of the disclosure.

The term "secure element (SE)" refers to a secure module including a single chip, in which security information (for example, a mobile communication network access key, user identification information such as an identification card/a passport or the like, credit card information, an encryption key, or the like) may be stored, and in which a control module (for example, a network access control module such as a universal subscriber identity module (USIM) or the like, an encryption module, a key generation module, or the like) using the stored security information may be loaded and operated. The SE may be used in various electronic devices (for example, a smartphone, a tablet, a wearable device, a car, an IoT device, and the like) and may provide a security service (for example, mobile communication network access, payment, user authentication, or the like) through the security information and the control module.

The SE may be classified into a universal integrated circuit card (UICC), an embedded secure element (eSE), a smart secure platform (SSP) in which a UICC and an eSE are integrated, and the like, and may also be classified into a removable type, an embedded type, and an integrated type in which the SE is integrated into a particular device or a system-on-chip (SoC), depending upon types of connection or mounting with respect to electronic devices.

A UICC is a smart card which is inserted into a mobile communication terminal or the like and used, and may also be referred to as a UICC card. The UICC may include an access control module for accessing a network of a mobile communication operator. Examples of the access control module include a universal subscriber identity module (USIM), a subscriber identity module (SIM), an IP multimedia service identity module (ISIM), and the like. A UICC including a USIM is also generally referred to as a USIM card. Likewise, a UICC including a SIM module is also generally referred to as a SIM card. A SIM module may be loaded into a UICC in the manufacture of the UICC, or a SIM module of a mobile communication service, which a user intends to use at an intended time point, may be downloaded to a UICC card. The UICC card may download and install a plurality of SIM modules, and may select at least one SIM module from among the plurality of SIM modules and use the at least one SIM module. The UICC card may be embedded in or may not be embedded in a terminal. A UICC embedded in a terminal and used is referred to as an embedded UICC (eUICC), and in particular, a UICC embedded in a communication processor, an application processor, or an SoC of a terminal is referred to as an integrated UICC (iUICC), the SoC including a single processor structure in which a communication processor and an application processor are integrated. Generally, an eUICC and an iUICC may each denote a UICC card, which is embedded in a terminal and used, and which may remotely download SIM modules and make a selection therefrom. In the disclosure, UICC cards capable of remotely downloading SIM modules and making a selection therefrom are collectively referred to as an eUICC or an iUICC. That is, among UICC cards capable of remotely downloading SIM modules and making a selection therefrom, UICC cards embedded or not embedded in a terminal are collectively referred to as an eUICC or an iUICC. In addition, downloaded SIM module information is collectively referred to as an eUICC profile or an iUICC profile, or may more simply referred to as the term "profile".

An eSE refers to an embedded SE, which is embedded in an electronic device and used. The eSE is generally manufactured for the exclusive use of a terminal manufacturer by the request of the terminal manufacturer, and may be manufactured to include an operating system and a framework. The eSE may remotely download a service control module having an applet form to install the service control module, and may be used for various security service purposes such as an electronic wallet, ticketing, an electronic passport, a digital key, and the like. In the disclosure, single chip-type SEs attached to electronic devices capable of remotely downloading and installing a service control module are collectively referred to as an eSE.

An SSP has a form of a single chip capable of integrally supporting both a function of a UICC and a function of an eSE. The SSP may be classified into a removable SSP (rSSP), an embedded SSP (eSSP), and an integrated SSP (iSSP) in which an SSP is embedded in an SoC. The SSP may include one primary platform (PP) and at least one secondary platform bundle (SPB) operating on the PP, the PP may include at least one of a hardware platform or a low-level operating system (LLOS), and the SPB may include a high-level operating system (HLOS) and at least one of applications running on the HLOS. An application running on an HLOS of the SPB may be referred to as an applet. The SPB may also be referred to as a bundle. The bundle may access resources such as a central processing unit, memory, and the like of the PP through a primary platform interface (PPI), and thus, may run on the PP. In the bundle, a communication application such as a SIM, a USIM, or an ISIM may be loaded, and various applications such as an electronic wallet, ticketing, an electronic passport, and a digital key may be loaded.

The SSP may be used for the purpose of the aforementioned UICC or eSE according to a bundle remotely downloaded and installed, and a plurality of bundles may be installed in a single SSP and simultaneously operated, thereby combining purposes of both a UICC and an eSE. That is, when the bundle including a profile is operated, the SSP may be used for the purpose of a UICC for accessing a network of a mobile communication operator. The corresponding UICC bundle may remotely download at least one profile, such as an eUICC profile or an iUICC profile, into the bundle, make a selection therefrom, and thus, be operated. In addition, when the bundle including a service control module, in which an application capable of providing a service such as an electronic wallet, ticketing, an electronic passport, or a digital key is loaded, is operated, the SSP may be used for the purpose of an eSE. A plurality of service control modules may be integrally installed to one bundle and operated, or may be respectively installed to independent bundles and operated.

Hereinafter, terms used herein will be described in more detail.

As used herein, the term "SSP" refers to a chip-type secure module, which has a form of a single chip capable of supporting a function of a UICC and a function of an eSE, and which may be classified into an rSSP, an eSSP, and an iSSP. The SSP may download a bundle from an external bundle management server (that is, a secondary platform bundle manager (SPB manager)) by using an over-the-air (OTA) technique and install the bundle thereto.

In the disclosure, a method of downloading and installing a bundle to the SSP by using the OTA technique may be equally applied to an rSSP capable of being inserted into and detached from a terminal, an eSSP mounted in a terminal, and an iSSP included in an SoC mounted in a terminal.

Herein, the term "UICC" may be used interchangeably with the term "SIM", and the term "eUICC" may be used interchangeably with the term "eSIM".

In the disclosure, an SPB runs on a PP of the SSP by using resources of the PP and, for example, a UICC bundle may refer to a software form into which an application, a file system, an authentication key value, and the like stored in an existing UICC, as well as an operating system (that is, an HLOS) on which such components listed above are operated, are packaged. In the disclosure, the SPB may be referred to as a bundle.

In the disclosure, a USIM profile may be used as the same meaning as a profile or may refer to a software form into which information included in a USIM application within the profile is packaged.

In the disclosure, an operation in which a terminal or an external server enables a bundle may refer to an operation of changing a state of the corresponding profile to an enabled state and thus setting the terminal to be allowed to receive a service (for example, a communication service, a credit card payment service, a user authentication service, or the like through a communication operator) provided by the corresponding bundle. A bundle in an enabled state may be expressed as an "enabled bundle". The bundle in an enabled state may be stored in an encrypted state in a storage space internal or external to the SSP.

In the disclosure, an enabled bundle may be changed to an active state according to an input from outside the bundle (for example, a user input, a push input, a request from an application within a terminal, an authentication request from a communication operator, a PP management message, or the like) or an operation internal to the bundle (for example, a timer, or polling). The bundle in an active state may refer to a bundle, which is loaded from a storage space internal or external to the SSP into driving memory inside the SSP, processes security information by using a secure control device (for example, a secure CPU) inside the SSP, and provides a security service to a terminal.

In the disclosure, an operation in which a terminal or an external server disables a bundle may refer to an operation of changing a state of the corresponding bundle to a disabled state and thus setting the terminal not to be allowed to receive a service provided by the corresponding bundle. A profile (or a bundle) in a disabled state may be expressed as a "disabled bundle". The bundle in a disabled state may be stored in an encrypted state in a storage space internal or external to the SSP.

In the disclosure, a bundle management server may include a function of generating a bundle by the request of a service provider or another bundle management server, encrypting the generated bundle, generating a bundle remote management instruction, or encrypting the generated bundle remote management instruction. The bundle management server providing the function set forth above may be expressed as at least one of an SPB Manager, a remote bundle manager (RBM), an image delivery server (IDS), subscription manager data preparation (SM-DP), subscription manager data preparation plus (SM-DP+), a manager bundle server, managing subscription manager data preparation plus (managing SM-DP+), a bundle encryption server, a bundle generation server, a bundle provisioner (BP), a bundle provider, or a bundle provisioning credentials (BPC) holder.

In the disclosure, the bundle management server may perform functions of allowing the SSP to download, install, and update a bundle and managing configurations of a key and a certificate both for remotely managing a state of the bundle. The bundle management server providing the functions set forth above may be expressed as at least one of an SPB Manager, an RBM), an IDS, subscription manager secure routing (SM-SR), subscription manager secure routing plus (SM-SR+), an off-card entity of eUICC profile manager, a profile management credentials (PMC) holder, or an eUICC manager (EM).

In the disclosure, a subscription mediating server may be expressed as at least one of a secondary platform bundle manager (SPBM), an RBM, a secondary platform bundle discovery sever (SPBDS), a bundle discovery sever (BDS), a subscription manager discovery service (SM-DS), a discovery service (DS), a root SM-DS, or an alternative SM-DS. The subscription mediating server may receive a Register Event Request (or Event Register Request) from one or more bundle management servers or subscription mediating servers. In addition, one or more subscription mediating servers may be used in combination, and in this case, a first subscription mediating server may receive a Register Event Request from a second subscription mediating server as well as a bundle management server. In the disclosure, functions of the subscription mediating server may be integrated into the bundle management server.

As used herein, the term "terminal" may be referred to as a mobile station (MS), a user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, or other terms. Various examples of the terminal may include a cellular phone, a smartphone having a wireless communication function, a personal digital assistant (PDA) having a wireless communication function, a wireless modem, a handheld computer having a wireless communication function, an image pickup device such as a digital camera having a wireless communication function, a gaming device having a wireless communication function, a music storing-and-playing household appliance having a wireless communication function, an Internet household appliance capable of performing wireless Internet connection and browsing, and handheld units or terminals integrally including combinations of the functions set forth above. In addition, the terminal may include a machine-to-machine (M2M) terminal, or a machine type communication (MTC) terminal/device, without being limited thereto. In the disclosure, the terminal may also be referred to as an electronic device. In the disclosure, an SSP capable of downloading and installing a bundle thereto may be embedded in the electronic device. When the SSP is not embedded in the electronic device, the SSP physically separated from the electronic device may be inserted into the electronic device and thus connected to the electronic device. For example, the SSP may be inserted, in a card form, into the electronic device. The electronic device may include a terminal, and here, the terminal may be a terminal including an SSP capable of downloading and installing a bundle thereto. The SSP may be embedded in the terminal, and when the terminal is separated from the SSP, the SSP may be inserted into the terminal and thus connected to the terminal.

In the disclosure, the terminal or the electronic device may include a local bundle assistant (LBA) or a local bundle manager (LBM), which is a piece of software or an application installed in the terminal or the electronic device to control an SSP.

In the disclosure, the terminal or the electronic device may include a local profile assistant (LPA), which is a piece of software or an application installed in the terminal or the electronic device to control an eUICC. The LPA may be implemented to be included in the LBA or may exist, as a separate application from the LBA, in the terminal. The LPA may be a piece of software or an application, which is capable of controlling an eSIM bundle of the terminal in which an SSP is embedded.

In the disclosure, a bundle identifier may be referred to as a bundle family identifier (that is, an SPB family identifier), a bundle matching ID, or a factor matching an event ID. The bundle identifier (that is, the SPB ID) may represent a unique identifier of each bundle. The bundle family identifier (that is, the SPB family identifier) may represent an identifier for classifying types of bundles (for example, a telecom bundle for accessing a network of a mobile communication operator). The bundle identifier may be used as a value capable of indexing a bundle in a bundle management server. In the disclosure, an SSP identifier may be a unique identifier of an SSP embedded in a terminal, and may be referred to as an SSP ID. In addition, when a terminal is not separated from an SSP chip as in an embodiment of the disclosure, the SSP ID may be a terminal ID. Further, the SSP ID may refer to a particular bundle identifier (that is, a particular SPB ID) within the SSP. More particularly, the SSP ID may refer to a bundle identifier of a management bundle or a loader (that is, a secondary platform bundle loader (SPBL)), which manages installation, activation, deactivation, and deletion of another bundle in the SSP. The SSP may have a plurality of SSP IDs, and the plurality of SSP IDs may be values derived from a unique and single SSP ID.

In the disclosure, the loader (that is, the SPBL) may refer to a management bundle which manages installation, activation, deactivation, and deletion of another bundle in the SSP. An LBA of a terminal, or a remote server may install, activate, deactivate, and delete a particular bundle through the loader (that is, the SPBL). In the disclosure, the loader (that is, the SPBL) may also be referred to as an SSP.

As used herein, the term "event" may be a term collectively referring to instructions for bundle download, remote bundle management, or other management/processing of a bundle or an SSP. An event may refer to a remote bundle provisioning operation (or an RBP operation) or an event record, and each event may refer to an event identifier (event ID or eventID) or a matching identifier (matching ID or matchingID) corresponding thereto and at least one of an address (a fully qualified domain name (FQDN), an Internet protocol (IP) address, or a uniform resource locator (URL)) or a server identifier of a bundle management server or a subscription mediating server, in which the corresponding event is stored, or data including at least one of identifiers of respective servers. The term "bundle download" may be used interchangeably with the term "bundle installation". In addition, the term "event type" may be used as a term for indicating whether a particular event is a bundle download, remote bundle management (for example, deletion, activation, deactivation, replacement, update, or the like), or other bundle or SSP management/processing commands, and may be referred to as an operation type (or OperationType), an operation class (or OperationClass), an event request type, an event class, an event request class, or the like.

In the disclosure, local bundle management (LBM) may be referred to as bundle local management, local management, a local management command, a local command, an LBM package, a bundle local management package, a local management package, a local management command package, or a local command package. The LBM may be used to change a state (for example, enabled, disabled, or deleted) of a particular bundle or change (or update) contents (for example, a bundle nickname, bundle metadata, or the like) of the particular bundle, through software installed in a terminal. The LBM may include one or more local management commands, and in this case, a bundle targeted by each local management command may be the same or different for each local management command.

In the disclosure, the term "target bundle" may be used as a term referring to a bundle targeted by a local management command or a remote management command.

In the disclosure, a service provider may denote an operator which requests bundle generation by issuing a requirement to a bundle management server and provides a service to a terminal through the corresponding bundle. For example, the service provider may denote a mobile operator providing a communication network access service through a bundle in which a communication application is loaded, and may collectively refer to all of a business supporting system (BSS), an operational supporting system (OSS), a point-of-sale (POS) terminal, and other IT systems of the mobile operator. In addition, the term "service provider" used herein is not limited to denoting only one particular operator, and may refer to a group or association (or consortium) of one or more operators or a representative representing the corresponding group or association. Further, in the disclosure, the service provider may be referred to as an operator (OP or Op.), a bundle owner (BO), an image owner (IO), or the like, and each service provider may be given or allocated at least one name and/or at least one object identifier (OID). When the service provider refers to a group or association of one or more operators or a representative thereof, the name or object identifier of any group, association, or representative may be a name or object identifier which is shared by all operators included in the corresponding group or association or by all operators cooperating with the corresponding representative.

In the disclosure, a network access application (NAA) may be an application such as a USIM or an ISIM which is stored in a UICC to access a network. The NAA may be a network access module.

In the disclosure, a telecom bundle may be a bundle including at least one NAA or a bundle having a function capable of remotely downloading at least one NAA and installing the at least one NAA thereto. In the disclosure, the telecom bundle may include a telecom bundle identifier indicating the telecom bundle.

In the disclosure, an eSIM bundle may be a bundle in which functions as an eUICC by executing an eUICC OS and thus allows a terminal to receive a profile. In the disclosure, the eSIM bundle may include a telecom bundle identifier indicating the eSIM bundle.

In the disclosure, an SSP activation code may refer to certain information for downloading a bundle to an SSP terminal.

In the disclosure, an eSIM activation code may refer to certain information for downloading a profile to an eSIM terminal or an SSP terminal. The eSIM activation code may include an SM-DP+ address, which is accessed for downloading a profile, or an address of an SM-DS server capable of informing about the SM-DP+ address, and may include an activation code token value that may be used as a matching identifier of a particular profile in an SM-DP+. When the eSIM activation code is input in the form of a QR code, data included in the QR code may be prefixed with 'LPA:'.

In the disclosure, an activation code may collectively refer to an SSP activation code and an eSIM activation code. Generally, in the disclosure, the activation code may be any activation code before determined as an SSP activation code or an eSIM activation code, and may be interpreted, by a terminal, as one of the SSP activation code and the eSIM activation code when the activation code is input to the terminal.

In the disclosure, an SSP activation code delimiter may be included as a component of the SSP activation code and indicate that a terminal may download a bundle (that is, a secondary platform bundle) through the corresponding activation code. The SSP activation code delimiter may also be referred to as a bundle indicator.

In describing the disclosure, a detailed description of known functions and configurations incorporated herein will be omitted when it may make the subject matter of the disclosure unclear.

Hereinafter, various embodiments of a method of installing a bundle or an applet (for example, a profile) to an SSP terminal and a terminal including another secure platform, by using an SSP activation code, will be described.

When the compatibility of the activation code is not ensured, a user or a service provider provides a suitable activation code according to a secure device of a terminal of the user, the user inputs the suitable activation code into the terminal that is to be used by himself, and this may deteriorate user experience of the user. To solve this, according to an embodiment of the disclosure, a bundle activation code of a smart secure device is configured to be compatible with an activation code allowing the installation of an applet (for example, an eSIM profile) of a service (for example, mobile communication network access, payment, user authentication, a digital key, or the like) internal to a bundle.

According to an embodiment of the disclosure, the activation code may be used for a method of downloading, installing, and storing an applet internal to a bundle and may also be used for a method of downloading, installing, and storing an applet to a secure platform (for example, an eUICC, or an eSE) other than a smart secure platform.

According to an embodiment of the disclosure, when the service provider provides a service by using an existing activation code, the service provider may not separate the existing activation code from an activation code for a smart secure platform to provide the service to a user. In addition, according to various embodiments of the disclosure, a user may selectively download a bundle or an applet by inputting an activation code for a smart secure platform to a terminal. Further, according to various embodiments of the disclosure, a smart secure platform terminal may perform a bundle download or an applet download according to information internal to an activation code. Furthermore, according to various embodiments of the disclosure, even when a terminal (for example, a terminal supporting only an eSIM) other than a smart secure platform terminal receives a smart secure platform bundle activation code as an input, the terminal may perform an applet download (for example, a profile download).

The disclosure includes the following embodiments regarding a method of installing a bundle or an applet (for example, a profile) to an SSP terminal and a terminal including another secure platform. However, embodiments of the disclosure are not limited to the following embodiments of the disclosure.

A method in which an SSP terminal defines an SSP activation code allowing a bundle or an applet to be downloaded A method in which an eSIM terminal or a terminal including another secure platform defines an SSP activation code allowing an applet to be downloaded A method in which an SSP terminal detects an SSP activation code and interprets components of the SSP activation code A method in which an SSP terminal downloads a bundle by using an SSP activation code A method in which an SSP terminal downloads an applet by using an SSP activation code A method in which an eSIM terminal or a terminal including another secure platform downloads an applet (for example, a profile) by using an SSP activation code A method in which an eSIM terminal or a terminal including another secure platform detects an SSP activation code and interprets components of the SSP activation code A method in which an eSIM terminal or a terminal including another secure platform downloads a bundle by using an SSP activation code Hereinafter, various embodiments regarding a method and an apparatus for downloading a bundle or an applet to an SSP terminal or a terminal including another secure platform by using an SSP activation code will be described in detail with reference to the accompanying drawings.

FIG. 1 is a diagram illustrating a terminal in which an SSP is embedded and an LBA application is installed, according to some embodiments of the disclosure.

Referring to FIG. 1, a terminal in which an SSP 130 is mounted and an LBA 120 is implemented is illustrated, the SSP 130 including a secondary platform bundle loader 131 and a primary platform 132, and the LBA 120 being an application internal to the terminal and capable of controlling the SSP 130. The SSP 130 may include at least one primary platform 132 and at least one secondary platform bundle loader 131. In addition, the SSP 130 may include a secondary platform bundle (also referred to as a bundle) 140, and the bundle 140 may include an application 141 and at least one high-level operating system 142. The bundle 140 may access resources such as a central processing unit or memory inside the primary platform 132 or the SSP 130 by using a primary platform interface (not shown) and may run in the SSP 130.

Referring to FIG. 1, the LBA 120 may include an activation code start detector 121 capable of detecting the start of an activation code, an activation code interpreter 122 capable of interpreting each element of the activation code, and a bundle and applet download trigger 123 causing an operation for downloading a bundle or an applet by using information internal to the activation code to be started. The LBA 120 may include components for performing various operations related to an operation of installing a bundle into an SSP in addition to the activation code start detector 121, the activation code interpreter 122, and the bundle and applet download trigger 123, and the LBA 120 may also include a component for performing an operation of processing a server or user input for controlling the bundle installed in the SSP and transmitting an instruction to the SSP. Here, the instruction transmitted by the LBA 120 may be performed by the primary platform 132 through the secondary platform bundle loader 131.

An SSP activation code or other activation codes (for example, an eSIM activation code) may be detected by the activation code start detector 121 of the LBA 120 in the terminal 110 and undergo interpretation of information internal thereto by the activation code interpreter 122, and the bundle and applet download trigger 123 may start an operation of downloading a bundle or an applet based on the interpreted information. To perform the operation of downloading a bundle or an applet, the LBA 120 may transmit an instruction to the secondary platform bundle loader 131 of the SSP 130.

Figure 2:
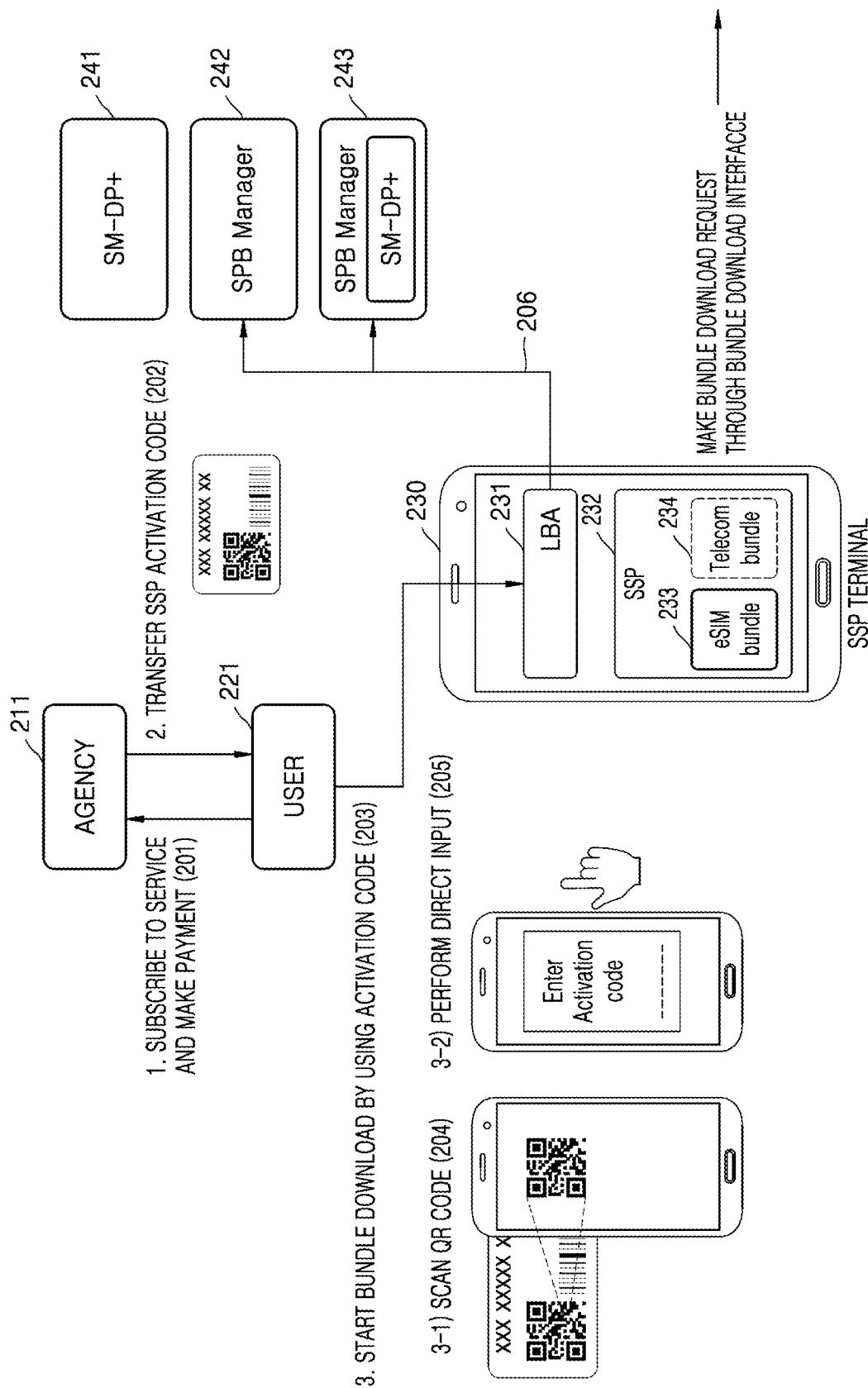
FIG. 2 is a diagram illustrating a procedure in which an SSP terminal downloads a bundle by using an SSP activation code, according to some embodiments of the disclosure.

FIG. 2 is a diagram illustrating a procedure in which an SSP terminal 230 downloads a bundle by using an SSP activation code, according to some embodiments of the disclosure. According to some embodiments of the disclosure, the SSP terminal 230 may be a terminal in which an SSP 232 is embedded and an LBA application 231 is installed. Here, the SSP 232 may include an eSIM bundle 233 and a telecom bundle 234, without being limited thereto.

In operation 201, a user 221 may subscribe to, via an agency 211, a service to be received through a bundle, and may pay therefor. In operation 202, the agency 211 may transfer, to the user 221, an SSP activation code including information allowing a bundle to be downloaded. In operation 203, the user 221 may cause the SSP terminal 230 to perform a bundle download operation by inputting the SSP activation code to the SSP terminal 230. In operation 203, a method in which the user 221 inputs the SSP activation code to the terminal may be one of a method of receiving the SSP activation code in the form of a QR code and then causing the terminal to scan (204) the QR code and a method of directly inputting (205) a string of the SSP activation code to the terminal. A method in which the user 221 in operation 203 inputs the SSP activation code to the terminal may include yet another method of inputting contents of the activation code to the terminal, in addition to the QR code scan (204) and the direct input (205).

In operation 206, the LBA 231 may perform an operation of downloading a bundle from an SPB manager server 242 or an SPB manager server 243 including an SM-DP+ function 241, by using the information of the SSP activation code.

Figure 3:
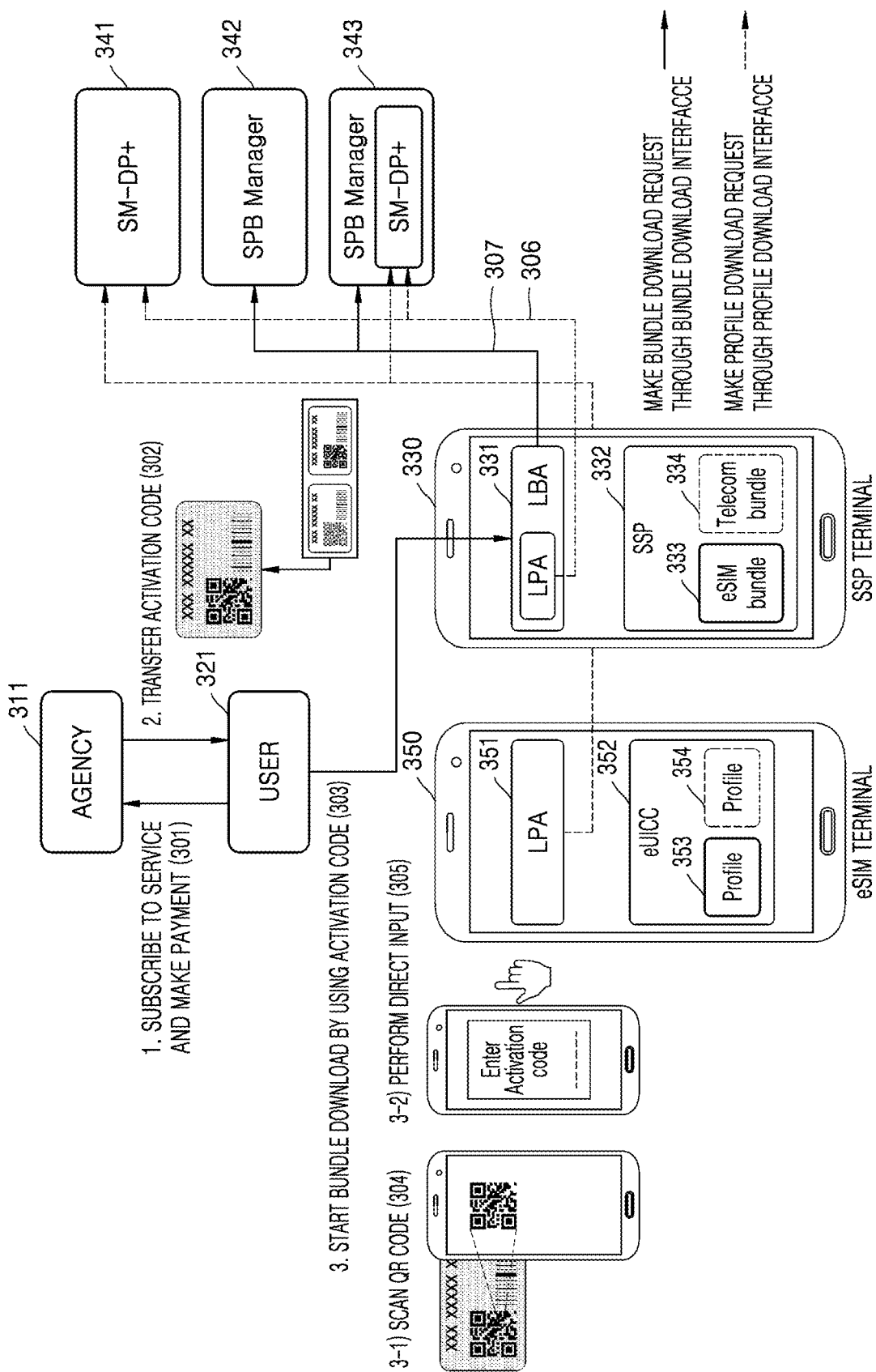
FIG. 3 is a diagram illustrating a procedure in which an SSP terminal, or a terminal including a secure platform other than an SSP, downloads a bundle or an applet by using an SSP activation code, according to some embodiments of the disclosure.

FIG. 3 is a diagram illustrating a procedure in which an SSP terminal 330 or a terminal 350 (for example, an eSIM terminal) including a secure platform other than an SSP downloads a bundle or an applet by using an SSP activation code, according to some embodiments of the disclosure. According to some embodiments of the disclosure, the SSP terminal 330 may be a terminal in which an SSP is embedded and an LBA application is installed. In addition, the terminal 350 including the secure platform other than the SSP may be a terminal in which an eUICC is embedded and an LPA application is installed.

In operation 301, a user 321 may subscribe to, via an agency 311, a service to be received through a bundle, and may pay therefor. In operation 302, the agency 311 may transfer, to the user 321, an SSP activation code including information allowing a bundle or an applet to be downloaded. It should be noted that the orders of operation 301 and operation 302 may be changed. In operation 303, the user 321 may input the SSP activation code to the terminal 330 or 350. In operation 303, a method in which the user 321 inputs the SSP activation code to the terminal 330 or 350 may be one of a method of receiving the SSP activation code in the form of a QR code and then causing the terminal 330 or 350 to scan (304) the QR code and a method of directly inputting (305) a string of the SSP activation code to the terminal 330 or 350. A method in which the user 321 in operation 303 inputs the SSP activation code to the terminal 330 or 350 may include yet another method of inputting contents of the activation code to the terminal 330 or 350, in addition to the QR code scan (304) and the direct input (305).

In operation 306, the terminal 330 or 350 receiving the activation code may make a request for a download of a profile to an SM-DP+ server 341 or an SPB manager 343 having an SM-DP+ function through an LPA 351 or an LBA 331 in which an LPA function is implemented. In operation 306, the profile may be any applet. In operation 306, the activation code may include one of minimum pieces of information (for example, an address of an SM-DP+, an applet matching ID, or an eUICC identifier) allowing an applet to be downloaded. The terminal 330 may be a terminal in which an SSP 232 is embedded and an LBA application 231 is installed. Here, the SSP 332 may include an eSIM bundle 333 and a telecom bundle 334, without being limited thereto.

In operation 307, the SSP terminal 330 receiving the activation code may make a request for a download of a bundle to the SPB manager 342 or 343 through the LBA 331. In operation 307, the LBA 331 may trigger a bundle download procedure with respect to the SPB manager 342 or 343 by using information included in the activation code. In operation 307, the information that may be used by the LBA 331 may include at least one of a domain address or an IP address of the SPB manager 342 or 343, a delimiter of the bundle, CODE_M that is a bundle matching identifier in a server, or a family identifier of the bundle.

The terminal 350 may be a terminal in which an eUICC 352 is embedded and an LPA application 351 is installed. Here, the eUICC 352 may include a profile 353 and a profile 354, without being limited thereto.

FIG. 4 is a diagram illustrating an example of a method of inputting an SSP activation code to an SSP terminal 410, according to some embodiments of the disclosure.

The SSP activation code may be input to the SSP terminal 410 by a method such as direct input (421), QR code scanning (422), or link clicking (423).

When providing the SSP activation code to a user, a service provider may provide a first string 431 which may be directly input (421) to the SSP terminal 410 by the user. In addition, the service provider may provide, to the user, the SSP activation code in the form of a QR code, and the QR code may be generated by encoding a string generated based on the first string 431. The user may input the SSP activation code by directly inputting (421) the first string 431, which is received from the service provider, to an LBA application of the SSP terminal 410. The first string 431 may be input to the LBA through a third party application or a manufacturer application in the terminal.

A string for generating the QR code may be generated by encoding the first string 431 as it is, or may be generated by prefixing the first string 431 with a string "LBA:", as in a second string 432, and then encoding the resultant. The string for generating the QR code may also be generated by prefixing the first string 431 with a string "LPA:", as in a third string 433. The third string 433 may be used when the SSP activation code including an eSIM activation code is generated as the QR code. In particular, the third string 433 may be used for the compatibility with an eSIM terminal that is based on GSMA SGP.22 v2. The QR code generated based on the third string 433 may be used for the purpose of generating the SSP activation code which may also be used for a v2 eSIM terminal complying with the GSMA SGP.22 standards.

The SSP activation code in the form of a QR code may be detected by a camera, a QR code scan application, or an LBA application within the terminal 410 and be input to the terminal 410.

In the method of QR code scanning (422), in detecting the SSP activation code in the form of a QR code by the camera, the third party application, or the manufacturer application in the terminal 410, when there is a particular string in the detected code, the terminal 410 may directly transfer information of the SSP activation code to the LBA through an internal application interworking operation and thus perform a bundle download procedure. In this case, the particular string in the detected code may be a string acting as a scheme of a uniform resource identifier (URI) [RFC3986] and may be a string such as "lba:".

The service provider may provide a string having a link clickable form to the user such that the user may input the SSP activation code by the method of link clicking (423). To allow the user to input the SSP activation code by the method of link clicking (423), the service provider may provide a string prefixed with "lba:", as in a fourth string 434, to the user. To allow the user to input the SSP activation code by the method of link clicking (423), the service provider may provide a string prefixed with "lpa:", as in a fifth string 435, to the user. In addition to the fourth string 434 and the fifth string 435, the service provider may also provide, to the user, a string having a form allowing link clicking (423) by adding a particular string as a prefix, and the LBA or LPA in the terminal 410 may receive the SSP activation code by link clicking (423) performed by the user. To allow the user to input the SSP activation code by the method of link clicking (423), the service provider may transfer a string having a form allowing link clicking (423) to the user through a short message service (SMS), an e-mail, or other applications.

Like the second string 432, the fourth string 434, and the fifth string 435, when the SSP activation code begins with a particular string, the particular string may be used as an SSP activation code delimiter.

FIG. 5 is a diagram illustrating an example of a configuration of an SSP activation code including a family-specific field, according to some embodiments of the disclosure.

Referring to FIG. 5, an SSP basic activation code 510 may be expressed by a series of elements called SSP basic information. The SSP basic activation code 510 may include an SSP activation code delimiter 511. The SSP activation code delimiter 511 may be at any location in the SSP basic activation code 510. To indicate the start of the SSP basic activation code 510, the SSP activation code delimiter 511 may be located in the foremost element of the SSP basic activation code 510. The SSP basic activation code 510 may include a family identifier 512 of a bundle that is to be downloaded by a terminal through an activation code. The SSP basic activation code 510 may include an address 513 of an SPB manager server that is to be accessed by the terminal for the terminal to download the bundle through the activation code. The SSP basic activation code 510 may include CODE_M 514, which is a matching ID of the bundle that is to be downloaded by the terminal through the activation code. The CODE_M 514 may be used as a matching ID for selecting the bundle to be downloaded from the SPB manager server. The SSP basic activation code 510 may include Challenge_S 515, which is an auxiliary matching ID of the bundle that is to be downloaded by the terminal through the activation code. The Challenge_S 515 may be used as an auxiliary matching ID for selecting the bundle to be downloaded from the SPB manager server. It should be noted that, in the SSP basic activation code 510, the orders of elements 512, 513, 514, and 515 including the SSP activation code delimiter 511 may be changed. In addition, the respective elements 511, 512, 513, 514, and 515 of the SSP basic activation code 510 may be separated from each other by inserting a delimiter such as '$' between adjacent elements. A method of separating respective elements of an SSP basic activation code is not limited to a method of inserting a characteristic string. The SSP basic activation code 510 may also include other elements in addition to the elements shown in FIG. 5. The SSP activation code delimiter 511 may be separated from other elements by using a string such as '%ETSI-SSP%'. The SSP activation code delimiter 511 may be any SSP activation code delimiter without limitation so long as the SSP activation code delimiter is a unique string which will not be found in a string anticipated to be used in an existing field value or a field that may be possibly added in the future.

Referring to FIG. 5, an SSP activation code 550 may include the SSP basic activation code 510 and a family-specific field 530. The family-specific field 530 may be an eSIM activation code including a piece of information allowing a profile to be downloaded to an eUICC or may include other pieces of information allowing an applet to be downloaded to an eSE. FIG. 5 illustrates an example of a configuration of the SSP activation code 550, in which the SSP basic activation code 510 is located after all pieces of information of the family-specific field 530. In the configuration of the SSP activation code 550 of FIG. 5, the SSP activation code delimiter 511 may be used as a delimiter for separating the family-specific field 530 from the SSP basic activation code 510. In FIG. 5, a configuration of the family-specific field 530 in the SSP activation code 550 may be determined by a value of the family identifier 512.

Although not shown in FIG. 5, the orders of the respective elements of the SSP basic activation code 510 and the respective elements of the family-specific field 530, in the SSP activation code 550, may be changed.

FIG. 6 is a diagram illustrating another example of a configuration of an SSP activation code including a family-specific field, according to some embodiments of the disclosure.

Referring to FIG. 6, an SSP basic activation code 610 may be expressed by a series of elements. In FIG. 6, an SSP activation code delimiter 615 may be at any location in the SSP basic activation code 610. To indicate the end of an SSP activation code, the SSP activation code delimiter 615 may be located in the last element of the SSP basic activation code 610. Among elements of the SSP basic activation code 610, because descriptions of a family identifier 611, an SPB manager address 612, CODE_M 613, and Challenge_S 614 are the same as those of the corresponding elements in FIG. 5, repeated descriptions thereof will be omitted. In addition, the respective elements 611, 612, 613, 614, and 615 of the SSP basic activation code 610 may be separated from each other by inserting a delimiter such as '$' between adjacent elements. A method of separating respective elements of an SSP basic activation code is not limited to a method of inserting a characteristic string. The SSP basic activation code 610 may also include other elements in addition to the elements shown in FIG. 6.

According to FIG. 6, an SSP activation code 650 may include the SSP basic activation code 610 and a family-specific field 630. Repeated descriptions of the family-specific field 630 given with reference to FIG. 5 will be omitted. FIG. 6 illustrates an example of the configuration of the SSP activation code 650, in which the family-specific field 630 is located after the SSP basic activation code 610. In the configuration of the SSP activation code 650 of FIG. 6, the SSP activation code delimiter 615 may be used as a delimiter for separating the SSP basic activation code 610 from the family-specific field 630. In FIG. 6, a configuration of the family-specific field 630 in the SSP activation code 650 may be determined by a value of the family identifier 611.

Although not shown in FIG. 6, the orders of the respective elements of the SSP basic activation code 610 and the respective elements of the family-specific field 630, in the SSP activation code 650, may be changed.

Figure 7A:
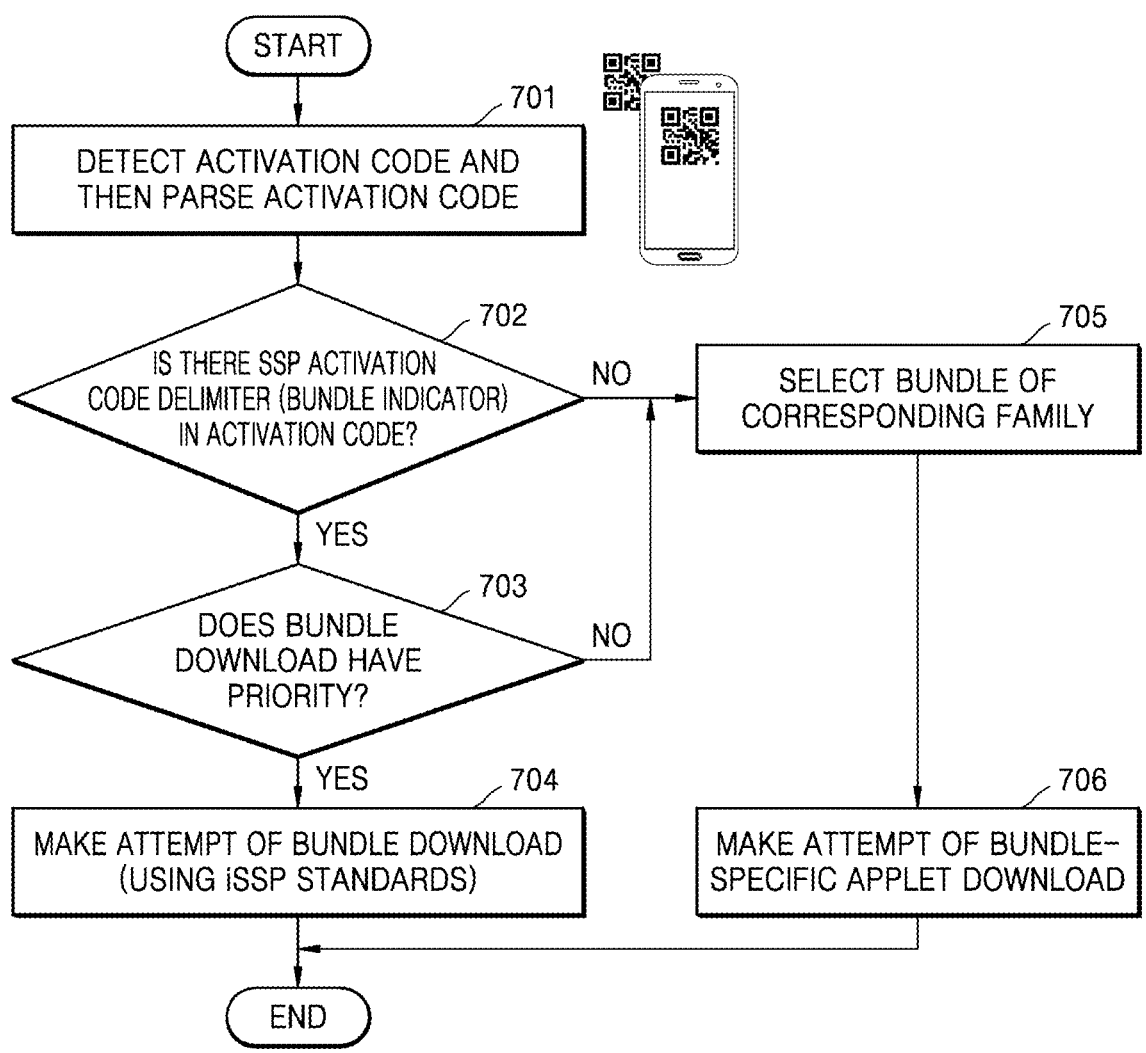
FIG. 7A is a diagram illustrating an operation procedure of an SSP terminal when the SSP terminal detects an activation code, according to some embodiments of the disclosure.

FIG. 7A is a diagram illustrating an operation procedure of an SSP terminal when the SSP terminal detects an activation code, according to some embodiments of the disclosure.

In operation 701, when certain information is input to the SSP terminal, the SSP terminal may detect an activation code from the certain information that is input, and may interpret elements internal to the activation code when the activation code is detected. The certain information that is input to the SSP terminal may be input by a manual or automatic input method including QR code scan, a text input by a user, an image input by a camera, link clicking, or the like. The certain information that is input to the SSP terminal may be provided by one of the methods according to the embodiment of the disclosure, which has been described with reference to FIG. 4. The terminal may determine that the activation code is included in the certain information which is input to the terminal according to a preset configuration. A method in which the terminal receives a certain input may include, to receive the certain input, an operation of displaying, to the user, a screen for prompting to input the activation code, or an operation of prompting to scan a QR code. In operation 701, a method in which the terminal recognizes that the activation code is input may include a method in which the terminal recognizes that data of the QR code begins with 'LBA:' or 'LPA:'. In operation 701, the method in which the terminal recognizes that the activation code is input may include a method in which an LBA recognizes that the user clicks a particular link.

In operation 701, the SSP terminal may receive certain information that may be used to receive an SSP activation code. The certain information that may be used to receive the SSP activation code may be referred to as SSP activation code acquisition information. The user may be provided with the SSP activation code acquisition information after the user purchases a bundle or a service from a service provider. The SSP activation code acquisition information may be provided in the form of a universal resource locator (URL) to the terminal, and the terminal may obtain the SSP activation code through a particular web site by way of the corresponding URL. In operation 701, the terminal may interpret elements included in the activation code according to a configuration of the activation code.

In operation 702, the terminal may determine whether there is an SSP activation code delimiter in the interpreted elements of the activation code.

When, in operation 702, there is the SSP activation code delimiter is in the activation code, in operation 703, the terminal may check whether downloading a bundle to an SSP is set to a default configuration. When there is no related configuration, the terminal may set downloading the bundle to the SSP to the default configuration. In operation 703, the bundle download may be set according to a family identifier of the bundle, and the determination by the terminal in operation 703 may be based on a terminal configuration made for a bundle family identifier included in the activation code.

When downloading the bundle to the SSP is set, in operation 704, the terminal may start a bundle download procedure by using information included in the activation code. In operation 704, the terminal may make an attempt to communicate with an SPB manager for a bundle download by using at least one of an address of the SPB manager, the family identifier of the bundle, a value of CODE_M, or a value of Challenge_S.

When, in operation 702, the SSP activation code delimiter in the activation code is not detected, or when, in operation 703, the bundle download for the bundle family identifier is not set in the terminal although there is the SSP activation code delimiter in the activation code, in operation 705, the terminal may perform an operation of installing an applet to the bundle of the corresponding family identifier. In operation 705, the terminal may activate a bundle pre-installed in the SSP corresponding to the family identifier internal to the activation code or may select one of activated bundles. When there is no family identifier in the activation code, the terminal may activate or select a bundle, which is basically set in the terminal, and use the bundle.

When the bundle to be used is selected in operation 705, in operation 706, the terminal may perform an operation of downloading an applet to the corresponding bundle. When, in operation 706, the family identifier of the bundle is a telecom family identifier, the applet may be a profile.

Figure 7B:
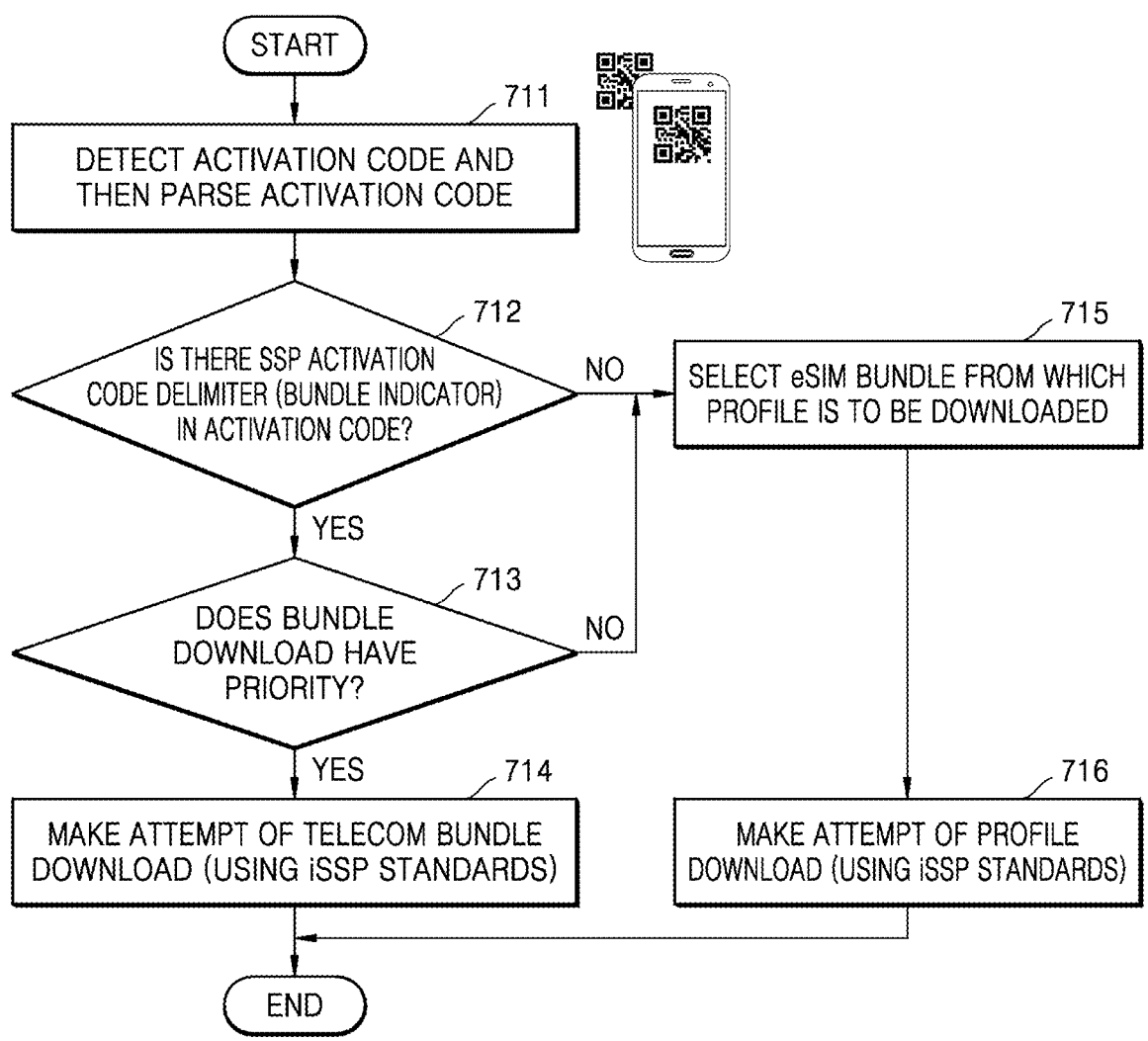
FIG. 7B is another diagram illustrating an operation procedure of an SSP terminal when the SSP terminal detects an activation code, according to some embodiments of the disclosure.

FIG. 7B is another diagram illustrating an operation procedure of an SSP terminal when the SSP terminal detects an activation code, according to some embodiments of the disclosure. FIG. 7B may represent an embodiment in which the family identifier of the bundle is a telecom family identifier, among embodiments intended to be described with reference to FIG. 7A. Operations 711 to 714 may correspond to operations 701 to 704 described above with reference to FIG. 7A, and operations corresponding to the above-described operations in FIG. 7A will be briefly described in the following descriptions regarding FIG. 7B. When, in operation 712, the family identifier of the bundle is a telecom family identifier, in operation 715, the terminal may activate an eSIM bundle or may select one of activated eSIM bundles.

When, in operation 712, the family identifier of the bundle is a telecom family identifier, operation 716 of downloading an applet may be a download procedure of a profile according to the GSMA Remote SIM Provisioning specification.

Figure 8A:
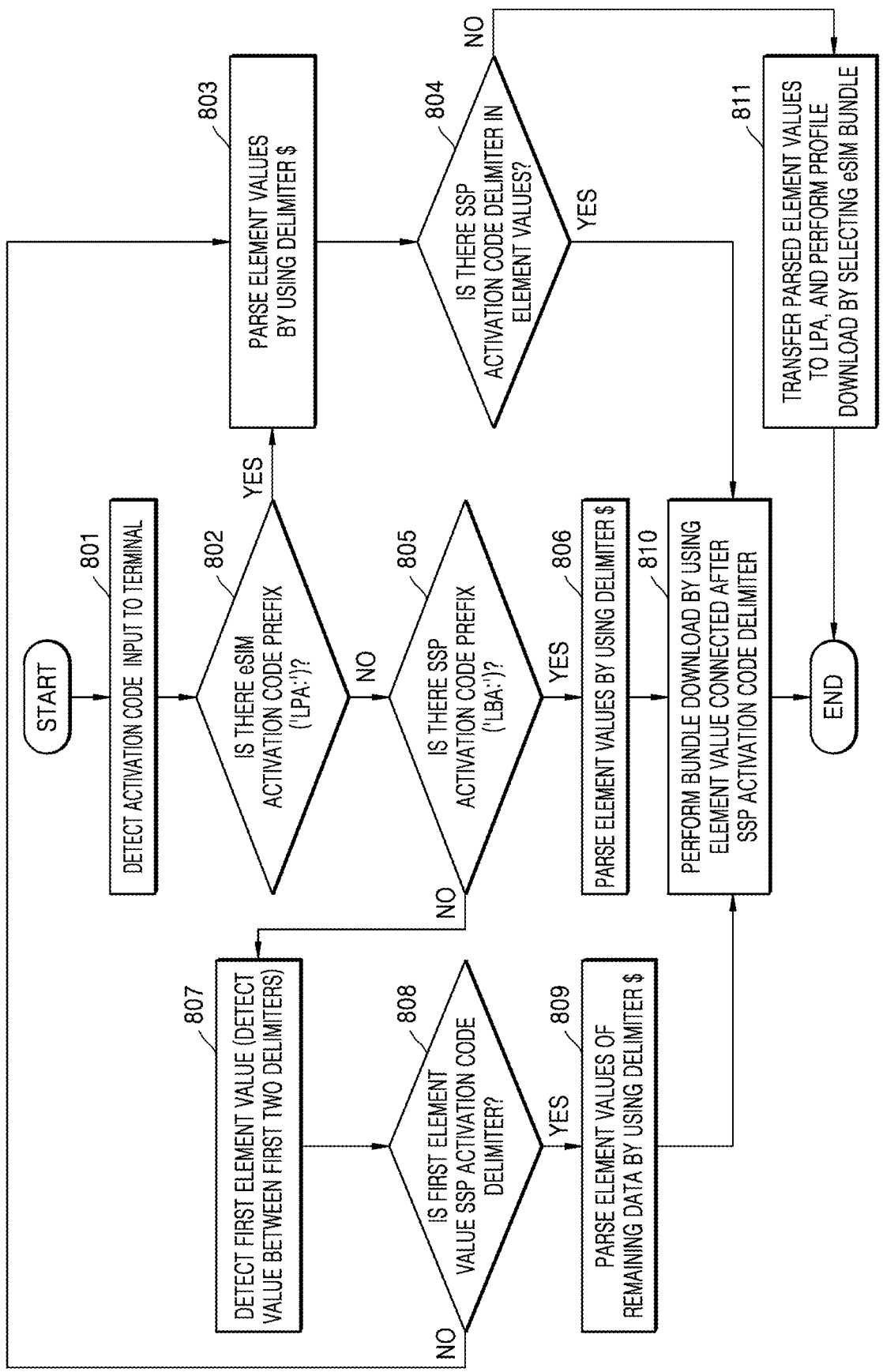
FIG. 8A is a diagram illustrating a procedure of operations in which an SSP terminal detects and interprets an activation code, according to some embodiments of the disclosure.
Figure 8B:
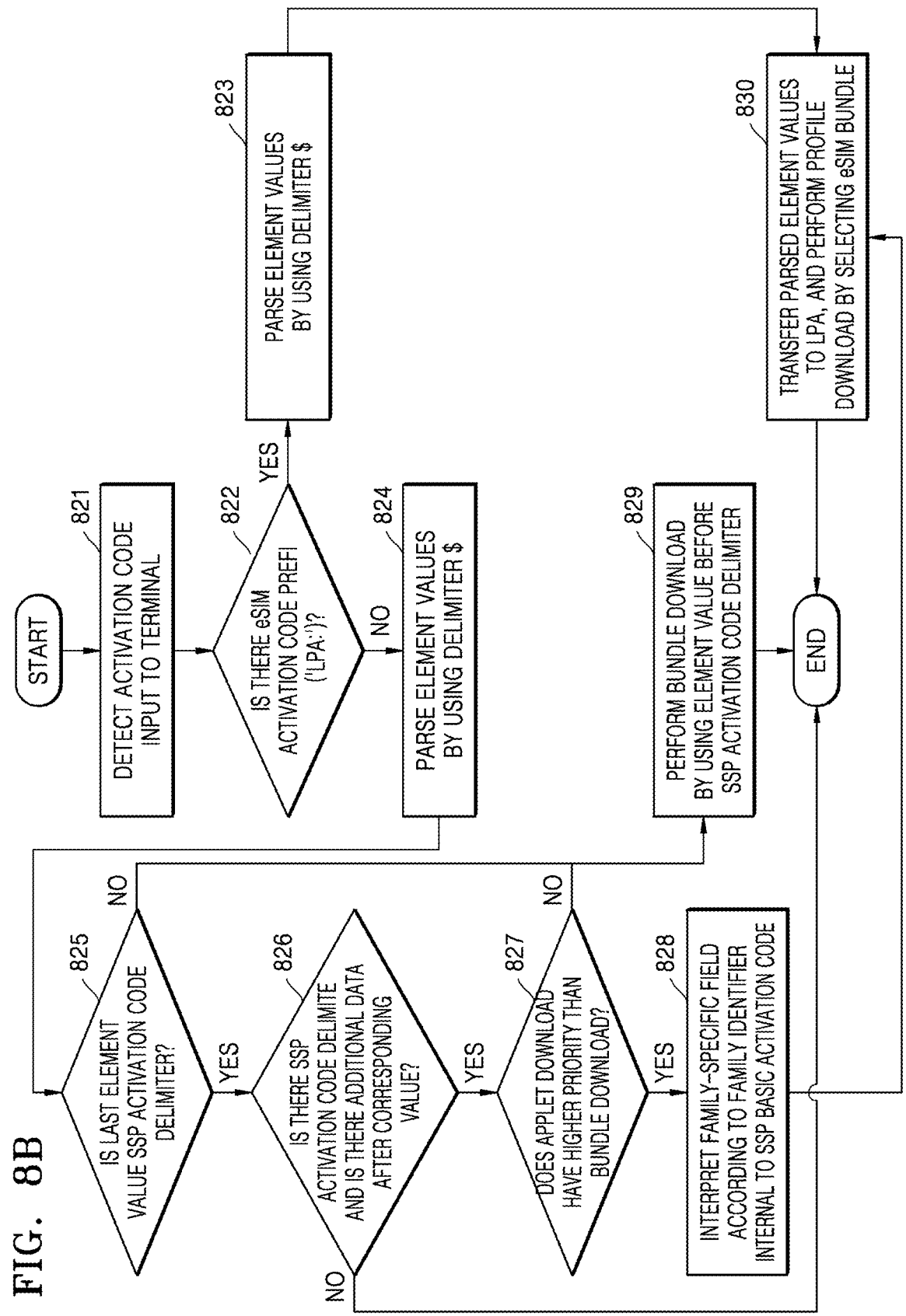
FIG. 8B is another diagram illustrating a procedure of operations in which an SSP terminal detects and interprets an activation code, according to some embodiments of the disclosure.

FIGS. 8A and 8B are each a diagram illustrating a procedure of operations in which an SSP terminal detects and interprets an activation code, according to some embodiments of the disclosure. In FIGS. 8A and 8B, an eSIM activation code defined in GSMA SGP.22 is taken as an example of other activation codes rather than an SSP activation code.

FIG. 8A is a diagram illustrating a method in which, when an SSP activation code conforms to the example shown in FIG. 5, an SSP terminal interprets the SSP activation code and is operated, according to some embodiments of the disclosure.

In operation 801, a terminal may detect an input of an activation code. For an LBA application to download a bundle or an applet, the terminal may display a screen for receiving the activation code to a user, cause the user to input a QR code, cause the user to click a particular link, or cause a camera application to detect the QR code. When, in operation 801, the terminal detects a QR code input, link clicking, or a text input, which is performed on the terminal, the terminal, in operation 802, may check whether there is an eSIM activation code prefix (for example, 'LPA:' or 'lpa:') in input data (that is, the input detected in operation 801).

When, in operation 802, it is confirmed that there is the eSIM activation code prefix in the data input to the terminal, in operation 803, the terminal may decompose element values by parsing the remaining data of the data input to the terminal by using a delimiter $. A method of parsing the element values is not limited to the method of using the delimiter $, and respective elements may be decomposed according to a separation method used upon configuring the SSP activation code.

In operation 804, the terminal may check whether there is an SSP activation code delimiter in the decomposed element values. When there is the SSP activation code delimiter (for example, %ETSI-SSP%) in the element values decomposed in operation 803, the terminal may recognize that the activation code input to the terminal is an SSP activation code and is also an activation code including information allowing a bundle to be downloaded.

When there in the SSP activation code delimiter is in the elements decomposed in operation 803, in operation 810, the terminal may recognize that the input activation code is an SSP activation code allowing a bundle download, and may perform a bundle download by using information (for example, an SPB manager address, a value of CODE_M, or the like) about elements located at specified locations based on the SSP activation code delimiter. According to a terminal configuration (applet installation has a higher priority than bundle installation) of the user, the terminal may perform a profile download by performing operation 811 instead of performing operation 810 even when there is the SSP activation code delimiter in the elements decomposed in operation 803.

When there is no SSP activation code delimiter in the elements decomposed in operation 803, the terminal may consider the input activation code as an eSIM activation code rather than an SSP activation code and thus perform operation 811. In operation 811, the terminal may transfer the parsed elements to an LPA and may perform a GSMA eSIM profile download procedure by selecting an eSIM bundle from the terminal (or by activating one eSIM bundle when there is no activated eSIM bundle).

When, in operation 802, the eSIM activation code is not detected at the foremost position of the data input to the terminal, in operation 805, the terminal may check whether there is an SSP activation code prefix (for example, 'LBA:' or 'lba:').

When, in operation 805, it is confirmed that there is the SSP activation code prefix in the data input to the terminal, in operation 806, the terminal may parse element values from the remaining data of the data input to the terminal based on a delimiter $. A method of parsing the element values is not limited to the method of using the delimiter $, and respective elements may be decomposed according to a separation method used upon configuring the SSP activation code. In operation 810, the terminal may perform a bundle download based on the parsed element values.

When, in operation 805, it is confirmed that there is no SSP activation code prefix in the data input to the terminal, in operations 807 and 808, the terminal may detect the foremost element value of the input data and may check whether the foremost element value of the input data is an SSP activation code delimiter. The case where, in operations 802 and 805, it is confirmed that there is no eSIM activation code prefix or no SSP activation code prefix in the data (that is, an activation code input) input to the terminal may be the case where, in operation 801, the terminal receives, as the activation code input, a string input rather than a QR code input. In this case, according to whether the first data (that is, the foremost data) of the data input to the terminal is an SSP activation code delimiter or not, it may be determined whether the activation code input to the terminal is an SSP activation code or not.

When, in operation 808, the first element value (that is, the foremost element value) among the element values parsed from the data input to the terminal is an SSP activation code delimiter, in operation 809, the terminal may parse the remaining data of the input data. In operation 810, the terminal may perform a bundle download based on the parsed data.

When, in operation 808, the first element value among the element values parsed from the data input to the terminal is not the SSP activation code delimiter, the corresponding activation code may not be an SSP activation code allowing a bundle download. Therefore, the terminal may perform a profile download according to operations 803, 804, and 811.

FIG. 8B is a diagram illustrating a method in which, when an SSP activation code conforms to the example shown in FIG. 6, an SSP terminal interprets the SSP activation code and is operated, according to some embodiments of the disclosure.

In operation 821, a terminal may detect an activation code input. When the activation code input is detected, in operation 822, the terminal may check whether there is an eSIM activation code prefix (for example, 'LPA:') in input data (that is, the activation code input).

When, in operation 822, it is confirmed that there is the eSIM activation code prefix in the data input to the terminal, in operation 823, the terminal may decompose element values by parsing the remaining data of the data input to the terminal. In operation 830, the terminal may transfer the parsed element values to an LPA and select an eSIM bundle, thereby performing a profile download procedure.

When, in operation 822, it is confirmed that there is no eSIM activation code prefix in the data input to the terminal, in operation 824, the terminal may decompose element values by parsing the input data by using a delimiter. A method of parsing the element values is not limited to the method of using a delimiter $, and respective elements may be decomposed according to a separation method used upon configuring the SSP activation code. In operation 825, the terminal may determine whether the last element value among the decomposed element values is the SSP activation code delimiter (for example, %ETSI-SSP%).

When, in operation 825, it is determined that the last element value is the SSP activation code delimiter, the terminal may consider the activation code input to the terminal as the SSP activation code including only the SSP basic activation code, which is information for a bundle download, and thus perform operation 829. In operation 829, the terminal may perform the bundle download by using decomposed element values (for example, a family identifier of a bundle, an SPB manager address, CODE_M, and the like).

When, in operation 825, it is determined that the last element value is not the SSP activation code delimiter, in operation 826, the terminal searches for a location of the SSP activation code delimiter in the decomposed element values. When there is the SSP activation code delimiter in the decomposed element values, the terminal may consider elements prior to the SSP activation code delimiter as elements (for example, a family identifier of a bundle, an SPB manager address, and CODE_M) of the SSP basic activation code, which is information usable for a bundle download, and may consider elements subsequent to the SSP activation code delimiter as values of a family-specific field allowing a download of an applet of the corresponding bundle. Here, the terminal may interpret each element value of the family-specific field by using a family identifier internal to the SSP basic activation code. For example, when the family identifier of the bundle is a telecom family identifier, the terminal may interpret each element of the family-specific field by causing each element of the family-specific field to correspond to the eSIM activation code. When, in operation 826, there is no SSP activation code delimiter in the decomposed element values, the terminal may determine that there is an error, and thus, may terminate the procedure.

When, in operation 826, the terminal succeeds in making a separation between the SSP basic activation code and the family-specific field based on the SSP activation code delimiter, in operation 827, the terminal checks, from an SSP configuration in the terminal, which one between the bundle download and the download of an applet within the bundle has a higher priority.

When, in operation 827, the bundle download has a higher priority or there is no configuration itself regarding the priority, in operation 829, the terminal may perform the bundle download by using element values of the SSP basic activation code.

When, in operation 827, the terminal configuration allows only the applet within the bundle to be installed or allows applet installation to be performed by priority, in operation 828, the terminal may install the applet by using element values of the family-specific field. As a specific example of operation 828, when the family identifier of the bundle is a telecom family identifier, the terminal may interpret each element value of the family-specific field by causing the family-specific field to correspond to the eSIM activation code. When, in operation 828, the element values of the family-specific field are interpreted, in operation 830, the terminal may transfer the family-specific field to the LPA. In addition, the terminal may select one from activated eSIM bundles in the terminal and cause the LPA to perform a procedure of installing a profile to the selected eSIM bundle.

Figure 9A:
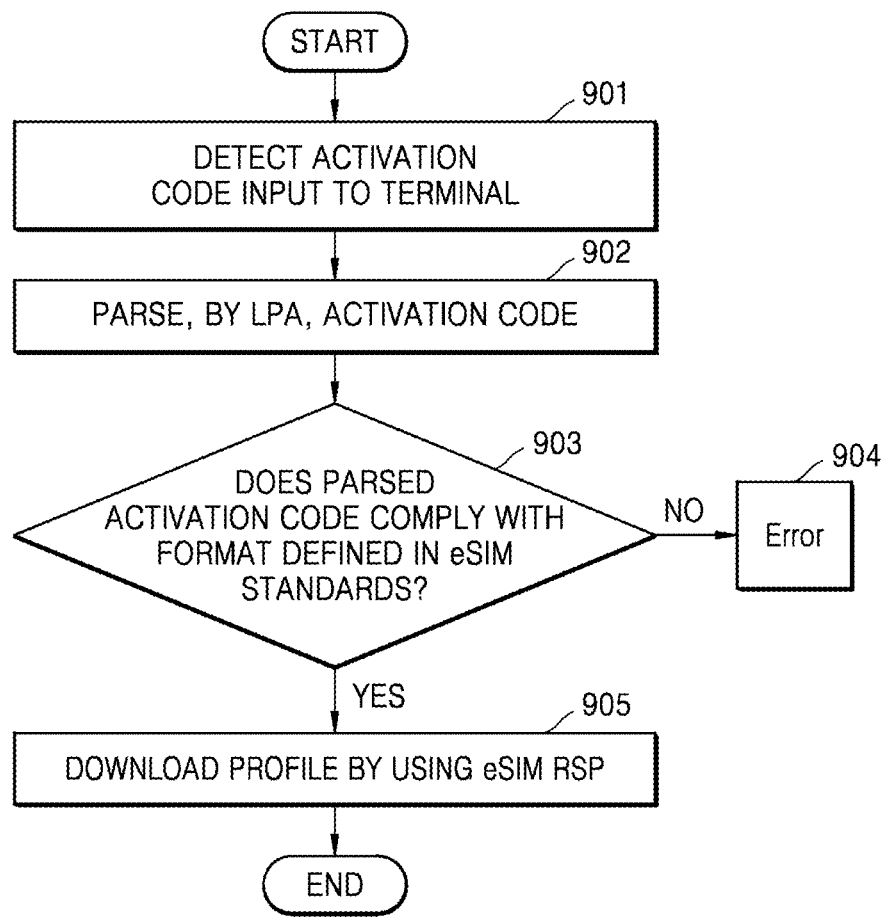
FIG. 9A is a diagram illustrating a procedure of operations in which a terminal including another secure platform (for example, an embedded universal integrated circuit card (eUICC)), rather than an SSP, detects and interprets an SSP activation code, according to some embodiments of the disclosure.
Figure 9B:
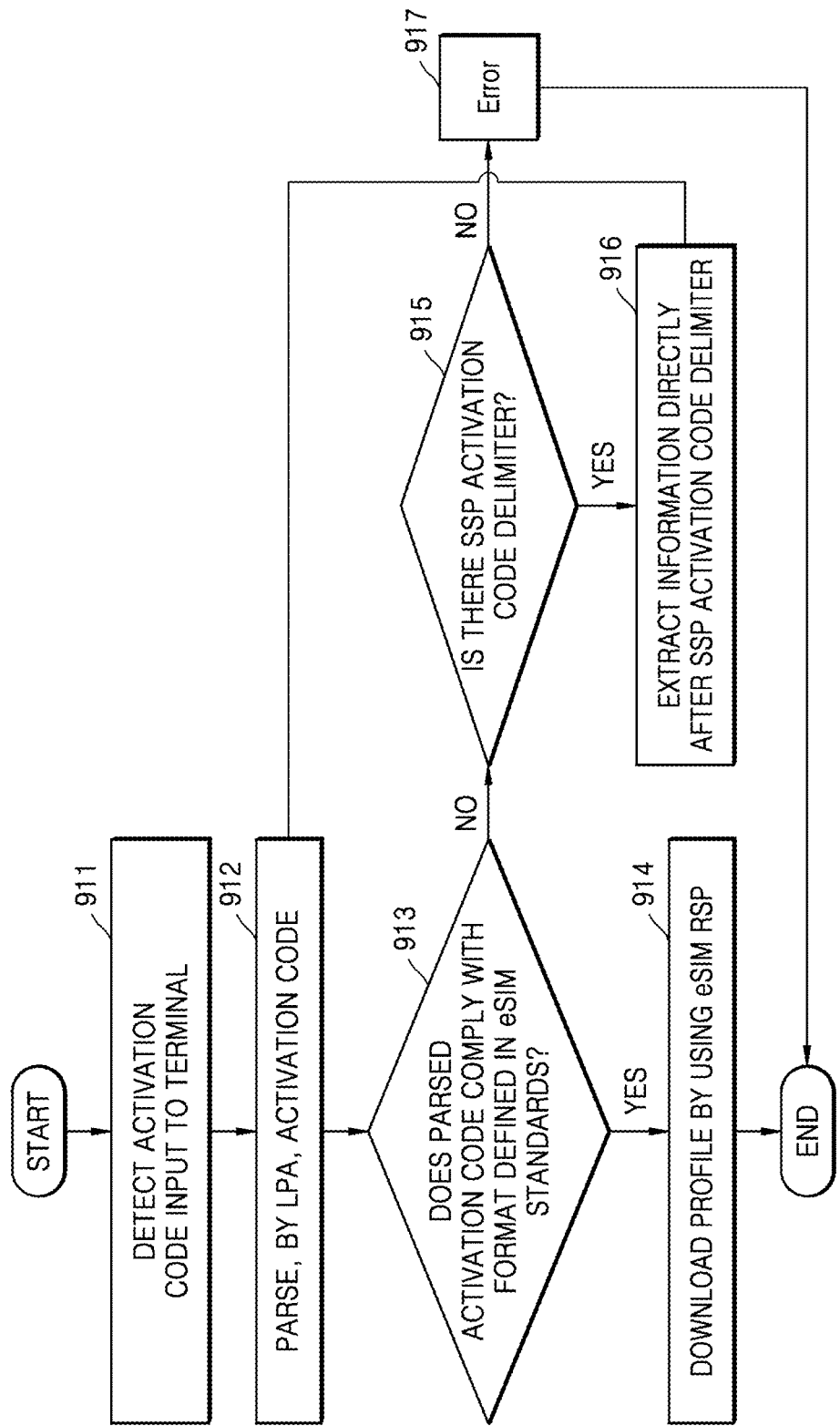
FIG. 9B is a diagram illustrating a procedure of operations in which a terminal including another secure platform (for example, an eUICC), rather than an SSP, detects and interprets an SSP activation code, according to some embodiments of the disclosure.

FIGS. 9A and 9B are each a diagram illustrating a procedure of operations in which a terminal including another secure platform (for example, an eUICC), rather than an SSP, detects and interprets an SSP activation code.

FIG. 9A is a diagram illustrating a procedure of operations in which an eSIM terminal detects and interprets an SSP activation code conforming to the embodiment of FIG. 5.

Regarding operation 901 of detecting an activation code input, a reference may be made to operation 801 of FIG. 8A. In operation 902, an LPA of the terminal may parse an activation code. When, in operation 903, elements of the parsed activation code comply with a format of an eSIM activation code defined in the eSIM standards, in operation 905, the terminal may perform a procedure of a profile download. An example in which, in operation 903, the parsed activation code complies with the format of the eSIM activation code may include an example in which the parsed activation code begins with a value of AC_FORMAT defined in the standards, and in which an SM-DP+ address, AC_TOKEN, and other optional elements are separated by the order and delimiter defined in the standards. When, in operation 903, the elements of the parsed activation code are not interpreted as those of the eSIM activation code, in operation 904, the terminal may determine that there is an error, and thus, may terminate the procedure.

FIG. 9B is a diagram illustrating a procedure of operations in which an eSIM terminal detects and interprets an SSP activation code conforming to the embodiment of FIG. 6.

Regarding operation 911, operation 912, and operation 913 of FIG. 9B, a reference may be made to the descriptions of operation 901, operation 902, and operation 903 of FIG. 9A. When an activation code input to the terminal is parsed in operation 912 and determined to comply with a format of an eSIM activation code in operation 913, an LPA of the terminal may perform a profile download by using information internal to the activation code. When, in operation 913, it is determined that parsed elements do not comply with the format of the eSIM activation code, in operation 915, the terminal may determine whether there is an SSP activation code delimiter in the parsed elements. When, in operation 915, there is the SSP activation code delimiter, because information after the SSP activation code delimiter is information of a family-specific field, in operation 916, the terminal may extract only the information directly after the SSP activation code delimiter and thus perform operation 912 again. When the family-specific field, which is after the SSP activation code delimiter, is the eSIM activation code, the terminal may pass the determination performed in operation 913 and perform a profile download procedure according to operation 914. When, in operation 915, the SSP activation code delimiter is not detected, in operation 917, the terminal may determine that there is an error, and thus, may terminate the procedure.

Figure 10:
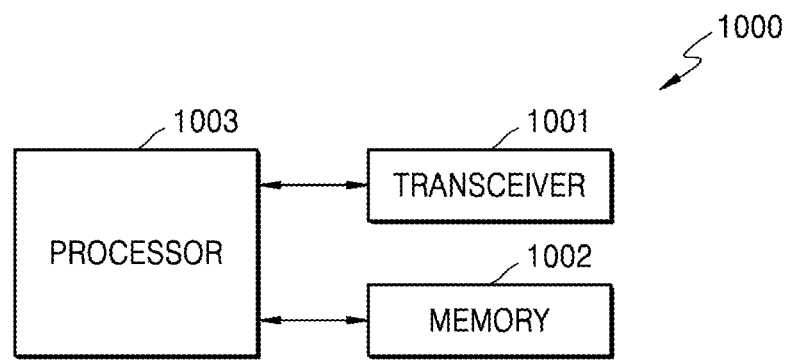
FIG. 10 is a diagram illustrating a structure of a terminal, according to some embodiments of the disclosure.

FIG. 10 is a diagram illustrating a structure of a terminal, according to some embodiments of the disclosure.

As shown in FIG. 10, the terminal 1000 of the disclosure may include a processor 1001, a transceiver 1002, and memory 1003. However, components of the terminal are not limited to the examples set forth above. For example, the terminal may include more components or less components than the components set forth above. In addition, the processor 1001, the transceiver 1002, and the memory 1003 may be implemented in the form of one chip. The structure of the terminal 110 shown in FIG. 1 may correspond to the structure of the terminal 1000 of FIG. 10, without being limited thereto.

According to some embodiments of the disclosure, the processor 1001 may control a series of processes in which the terminal may be operated according to the above-described embodiments of the disclosure. The processor 1001 may be provided in a plural number, and the processor 1001 may perform the methods according to the above-described embodiments of the disclosure by executing a program stored in the memory 1003.

The transceiver 1002 may transmit a signal to and receive a signal from a service provider. The signal transmitted to and received from the service provider may include control information and data. The transceiver 1002 may include a radio frequency (RF) transmitter up-converting and amplifying a frequency of a transmitted signal and an RF receiver performing low-noise amplification and frequency down-conversion on a received signal. However, this is merely an example of the transceiver 1002, and components of the transceiver 1002 are not limited to the RF transmitter and the RF receiver. In addition, the transceiver 1002 may receive a signal through a radio channel and output the signal to the processor 1001, and may transmit, through the radio channel, a signal that is output from the processor 1001.

According to some embodiments of the disclosure, the memory 1003 may store a program and data used for operations of the terminal. In addition, the memory 1003 may store control information or data included in a signal transmitted and received by the terminal. The memory 1003 may include a storage medium such as ROM, RAM, a hard disk, CD-ROM, and a DVD, or a combination of storage media. In addition, the memory 1003 may be provided in a plural number.

Figure 11:
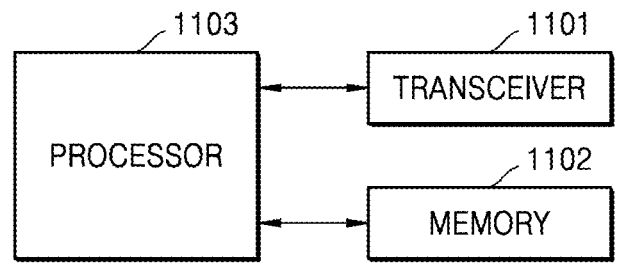
FIG. 11 is a diagram illustrating a structure of a service provider, according to some embodiments of the disclosure.

FIG. 11 is a diagram illustrating a structure of a service provider, according to some embodiments of the disclosure.

As shown in FIG. 11, the service provider of the disclosure may include a processor 1101, a transceiver 1102, and memory 1103. However, components of the service provider are not limited to the examples set forth above. For example, the service provider may include more components or less components than the components set forth above. In addition, the processor 1101, the transceiver 1102, and the memory 1103 may be implemented in the form of one chip. The processor 1101 may control a series of processes such that the service provider may be operated according to the above-described embodiments of the disclosure.

The transceiver 1102 may transmit a signal to and receive a signal from the terminal. The signal transmitted to and received from the terminal may include control information and data. The transceiver 1102 may include an RF transmitter up-converting and amplifying a frequency of a transmitted signal and an RF receiver performing low-noise amplification and frequency down-conversion on a received signal. However, this is merely an example of the transceiver 1102, and components of the transceiver 1102 are not limited to the RF transmitter and the RF receiver. In addition, the transceiver 1102 may receive a signal through a radio channel and output the signal to the processor 1101, and may transmit, through the radio channel, a signal that is output from the processor 1101. The processor 1101 may be provided in a plural number, and the processor 1101 may perform the methods according to the above-described various embodiments of the disclosure by executing a program stored in the memory 1103.

According to some embodiments of the disclosure, the memory 1103 may store a program and data used for operations of the service provider. In addition, the memory 1103 may store control information or data included in a signal transmitted and received by the service provider. The memory 1103 may include a storage medium such as ROM, RAM, a hard disk, CD-ROM, and a DVD, or a combination of storage media. In addition, the memory 1103 may be provided in a plural number. The methods according to the claims or embodiments of the disclosure described herein may be implemented in the form of hardware, software, or a combination of hardware and software.

When the methods are implemented by software, a computer-readable storage medium, which stores one or more programs (software modules), may be provided. One or more programs stored in the computer-readable storage medium are configured to be executable by one or more processors in an electronic device. The one or more programs include instructions causing the electronic device to perform the methods according to the claims or embodiments of the disclosure described herein.

These programs (software modules or software) may be stored in RAM, non-volatile memory including flash memory, ROM, electrically erasable programmable read only memory (EEPROM), a magnetic disc storage device, CD-ROM, DVDs or other types of optical storage devices, or a magnetic cassette. Alternatively, these programs may be stored in memory including a combination of some or all of the example memory devices set forth above. In addition, each constituent memory included in the memory may be provided in a plural number.

Further, the programs may be stored in an attachable storage device that is accessible via a communication network, such as the Internet, an intranet, a local area network (LAN), a wide LAN (WLAN), or a storage area network (SAN), or a communication network including a combination thereof. Such a storage device may be connected to a device for performing the embodiments of the disclosure via an external port. In addition, a separate storage device on a communication network may be connected to the device for performing the embodiments of the disclosure.

In the above-described embodiments of the disclosure, the component included in the disclosure has been expressed in a singular or plural form according to a specifically presented embodiment. However, the expression in a singular or plural form has been selected suitably to a presented situation for descriptive convenience, the disclosure is not limited to the component expressed in a singular or plural form, and the component may be provided by as many as a single quantity even though expressed in a plural form or may be provided by as many as a plural quantity even though expressed in a singular form.

Although specific embodiments of the disclosure have been described in the detailed description of the disclosure, it should be understood that various modifications, changes, and alterations can be made without departing from the spirit and scope of the disclosure. Therefore, the foregoing embodiments of the disclosure are not to be construed in any way as limiting the disclosure, and the scope of the disclosure should be defined only by the accompanying claims and equivalents thereof.

It should be understood that various embodiments of the disclosure and terms used therein are not intended to limit the disclosure to particular embodiments of the disclosure, and that various changes, equivalents, and/or substitutes with respect to the corresponding embodiments may be made without departing from the spirit and scope of the disclosure. In relation to the descriptions of the accompanying drawings, like components may be denoted by like reference numerals. The singular terms used herein are intended to include the plural forms as well, unless the context clearly indicates otherwise. As used herein, the terms such as "A or B," "at least one of A and/or B," "A, B, or C," or "at least one of A, B, and/or C" may include all possible combinations of the items listed together. As used herein, the terms such as "first" and "second" may specify corresponding components regardless of importance, are used merely to distinguish one component from another component, and do not limit the corresponding components. It will be understood that, when a certain (for example, a first) element is referred to as being "(functionally or communicatively) connected to" another element, the certain element may be directly connected to the other element or may be connected to the other element via yet another element (for example, a third element).

As used herein, the term "module" includes a unit implemented by hardware, software, or firmware, and may be used interchangeably with the terms such as "logic," "logic block," "part," or "circuit". The module may be an integrally implemented part, a minimum unit performing one or more functions, or a portion thereof. For example, the module may include an application-specific integrated circuit (ASIC).

Various embodiments of the disclosure may be implemented by software (for example, a program) including instructions stored in machine (for example, a computer)-readable storage media (for example, internal memory or external memory). The machine is a device which may invoke a stored instruction from storage media and be operated according to the invoked instruction, and the machine may include terminals according to various embodiments of the disclosure. When the instruction is executed by a processor, the processor may perform a function corresponding to the instruction directly, or by using other components under the control of the processor. The instruction may include a code generated or executed by a compiler or an interpreter.

The machine-readable storage media may be provided in the form of a non-transitory storage media. Herein, the term "non-transitory" merely means that the storage media do not include a signal and are tangible, and it does not matter whether data is semi-permanently or temporarily stored in the storage media.

The methods according to various embodiments of the disclosure may be provided while included in a computer program product. The computer program product may be traded, as merchandise, between a seller and a buyer. The computer program product may be distributed in the form of a machine-readable storage medium (for example, CD-ROM), or distributed online through an application store (for example, Play Store™). In the case of online distribution, at least a portion of the computer program product may be at least temporarily stored or temporarily generated in a storage medium such as memory of a server of a manufacturer, a server of an application store, or a relay server. Each component (for example, each module or program) according to various embodiments of the disclosure may include a single entity or a plurality of entities, and some of the corresponding sub-components set forth above may be omitted, or other sub-components may be further included in each component in various embodiments of the disclosure. Alternatively or additionally, some components (for example, modules or programs) may be integrated into one entity and may identically or similarly perform functions performed by the respectively corresponding components before the integration. Operations performed by modules, programs, or other components according to various embodiments of the disclosure may be performed sequentially, in parallel, repeatedly, or heuristically, at least some of the operations may be performed in a different order or be omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An operating method of a terminal, in which a smart secure platform (SSP) is embedded, in a wireless communication system, the operating method comprising:
   obtaining an activation code including an SSP activation code and an embedded subscriber identity module (eSIM) activation code;
   detecting an SSP activation code delimiter in the activation code;
   detecting the SSP activation code in the activation code by using the SSP activation code delimiter; and
   downloading at least one of a bundle or an applet by using the SSP activation code,
   wherein the SSP activation code delimiter is used to separate the SSP activation code from the eSIM activation code.

2. The operating method of claim 1, wherein the eSIM activation code is used by a local profile assistant (LPA) to download a profile to an embedded universal integrated circuit card (eUICC).

3. The operating method of claim 1, wherein:
   the SSP activation code delimiter is located at a foremost position of the SSP activation code, and
   the eSIM activation code is arranged before the SSP activation code in the activation code.

4. The operating method of claim 1, wherein:
the SSP activation code delimiter is located at a backmost position of the SSP activation code, and
the eSIM activation code is arranged after the SSP activation code in the activation code.

5. The operating method of claim 1, wherein the SSP activation code comprises at least one of a family identifier of the bundle, an address of a secondary platform bundle (SPB) manager server, from which the bundle is to be downloaded, or a matching identifier (ID) of the bundle.

6. The operating method of claim 5, wherein:
the family identifier of the bundle is a telecom family identifier,
the bundle is a telecom bundle, and
the applet is a profile.

7. The operating method of claim 1, wherein the downloading of the at least one of the bundle or the applet comprises downloading at least one of the bundle or the applet from an SPB manager server through a local bundle assistant (LBA).

8. The operating method of claim 1, wherein the obtaining of the activation code comprises obtaining the activation code through at least one of a quick response (QR) code scan, a text input, or a link.

9. A terminal, in which a smart secure platform is embedded, in a wireless communication system, the terminal comprising:
a transceiver; and
a processor configured to:
obtain an activation code including an SSP activation code and an embedded subscriber identity module (eSIM) activation code;
detect a smart secure platform (SSP) activation code delimiter in the activation code;
detect the SSP activation code in the activation code by using the SSP activation code delimiter; and
download at least one of a bundle or an applet by using the SSP activation code,
wherein the SSP activation code delimiter is used to separate the SSP activation code from the eSIM activation code.

10. The terminal of claim 9, wherein the eSIM activation code is used by a local profile assistant (LPA) to download a profile to an embedded universal integrated circuit card (eUICC).

11. The terminal of claim 9, wherein:
the SSP activation code delimiter is located at a foremost position of the SSP activation code, and
the eSIM activation code is arranged before the SSP activation code in the activation code.

12. The terminal of claim 9, wherein:
the SSP activation code delimiter is located at a backmost position of the SSP activation code, and
the eSIM activation code is arranged after the SSP activation code in the activation code.

13. The terminal of claim 10, wherein the SSP activation code comprises at least one of a family identifier of the bundle, an address of a secondary platform bundle (SPB) manager server, from which the bundle is to be downloaded, or a matching identifier (ID) of the bundle.

14. The terminal of claim 13, wherein:
the family identifier of the bundle is a telecom family identifier,
the bundle is a telecom bundle, and
the applet is a profile.

15. The terminal of claim 9, wherein the processor is configured to download at least one of the bundle or the applet from an SPB manager server through a local bundle assistant (LBA).

16. The terminal of claim 9, wherein the processor is configured to obtain the activation code through at least one of a quick response (QR) code scan, a text input, or a link.

* * * * *